US008289987B2

(12) United States Patent
Adachi et al.

(10) Patent No.: US 8,289,987 B2
(45) Date of Patent: Oct. 16, 2012

(54) WIRELESS COMMUNICATION SYSTEM AND WIRELESS TERMINAL

(75) Inventors: Tomoko Adachi, Urayasu (JP); Masahiro Takagi, Tokyo (JP); Tomoya Tandai, Tokyo (JP); Tetsu Nakajima, Yokohama (JP); Yoriko Utsunomiya, Tokyo (JP); Yasuyuki Nishibayashi, Kawasaki (JP); Daisuke Takeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 271 days.

(21) Appl. No.: 12/236,608

(22) Filed: Sep. 24, 2008

(65) Prior Publication Data
US 2009/0022132 A1 Jan. 22, 2009

Related U.S. Application Data

(62) Division of application No. 11/137,661, filed on May 26, 2005.

(30) Foreign Application Priority Data

May 28, 2004 (JP) ................................. 2004-160175
Jun. 10, 2004 (JP) ................................. 2004-173139

(51) Int. Cl.
*H04L 12/43* (2006.01)
(52) U.S. Cl. .......................... 370/445; 370/334; 370/466
(58) Field of Classification Search .................. 370/338, 370/204, 208, 53, 352, 347
See application file for complete search history.

(56) References Cited

U.S. PATENT DOCUMENTS

| 6,914,890 | B1 * | 7/2005 | Tobita et al. ................... 370/338 |
| 7,224,704 | B2 | 5/2007 | Lu et al. |
| 7,369,511 | B2 | 5/2008 | Utsunomiya et al. |
| 7,428,421 | B2 * | 9/2008 | Jain et al. ...................... 455/515 |
| 7,552,246 | B2 * | 6/2009 | Mahany et al. ................. 710/18 |
| 2002/0172212 | A1 | 11/2002 | Erving |
| 2002/0191573 | A1 | 12/2002 | Whitehill et al. |
| 2003/0072280 | A1 | 4/2003 | McFarland et al. |
| 2003/0206524 | A1 | 11/2003 | Mohanty et al. |
| 2004/0057507 | A1 | 3/2004 | Rotstein et al. |
| 2004/0104844 | A1 | 6/2004 | Rooyen et al. |
| 2004/0106385 | A1 | 6/2004 | Kazakevich et al. |
| 2004/0152489 | A1 | 8/2004 | Kikuchi et al. |

(Continued)

FOREIGN PATENT DOCUMENTS

JP 2000-151639 5/2000

(Continued)

OTHER PUBLICATIONS

Office Action issued Mar. 8, 2011, in Japanese Patent Application No. 2008-125212 (with English-language translation).

(Continued)

*Primary Examiner* — Ajit Patel
*Assistant Examiner* — Julio Perez
(74) *Attorney, Agent, or Firm* — Oblon, Spivak, McClelland, Maier & Neustadt, L.L.P.

(57) ABSTRACT

A wireless communication system includes first and second wireless terminals capable of performing transmission by at least one of a first transmission scheme and a second transmission scheme. The first wireless terminal performs transmission of a first frame to the second wireless terminal by using the second transmission scheme. The second wireless terminal communicates with the first wireless terminal to notify the first wireless terminal of information associated with a status of the reception of the first frame transmitted from the first wireless terminal by using the first transmission scheme.

32 Claims, 21 Drawing Sheets

U.S. PATENT DOCUMENTS

| | | | |
|---|---|---|---|
| 2005/0239455 A1* | 10/2005 | Stephens | 455/426.2 |
| 2006/0205396 A1 | 9/2006 | Laroia et al. | |
| 2006/0256756 A1 | 11/2006 | Wakabayashi | |

FOREIGN PATENT DOCUMENTS

| | | |
|---|---|---|
| JP | 2000-174725 | 6/2000 |
| JP | 2003-264563 | 9/2003 |
| JP | 2004-531971 | 10/2004 |
| JP | 2005-102136 | 4/2005 |
| WO | WO 03/058887 A1 | 7/2003 |
| WO | WO 03/075514 A1 | 9/2003 |

OTHER PUBLICATIONS

Peter Larsson, "Ericsson Radio Systems AB", Tiered Transmitter Power Control (TTPC) Proposal for 802.11h WLAN, IEEE 802.11-01/215r1, URL, https://mentor.ieee.org/802.11/dcn/01/11-01-0215-01-000h-tiered-tpc.zip, May 14, 2001, 7 pages.

Office Action mailed on Nov. 24, 2010, in Japanese Patent Application No. 2008-125212 (with English Translation).

Search Report issued Jan. 21, 2011 in Europe Application No. 05253270.2.

* cited by examiner

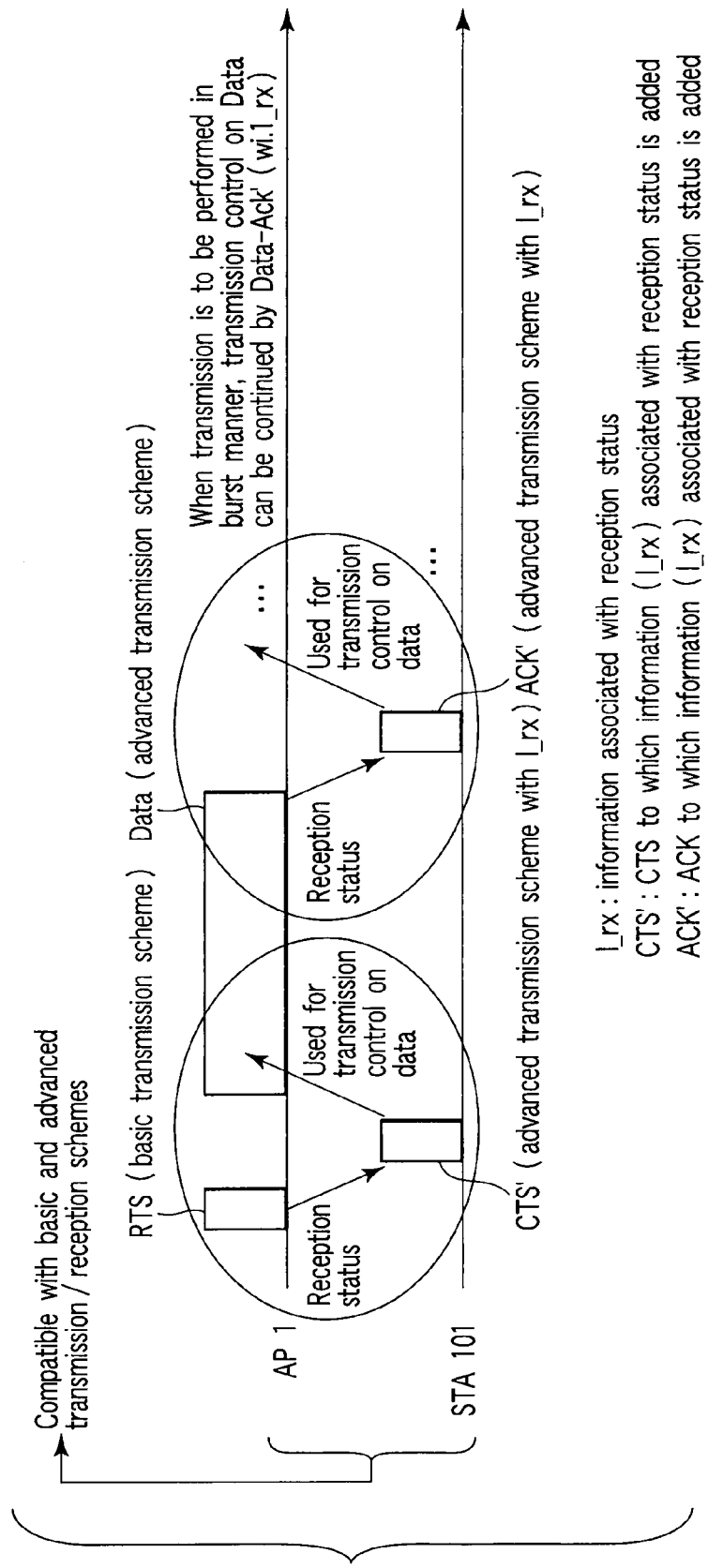
F I G. 5

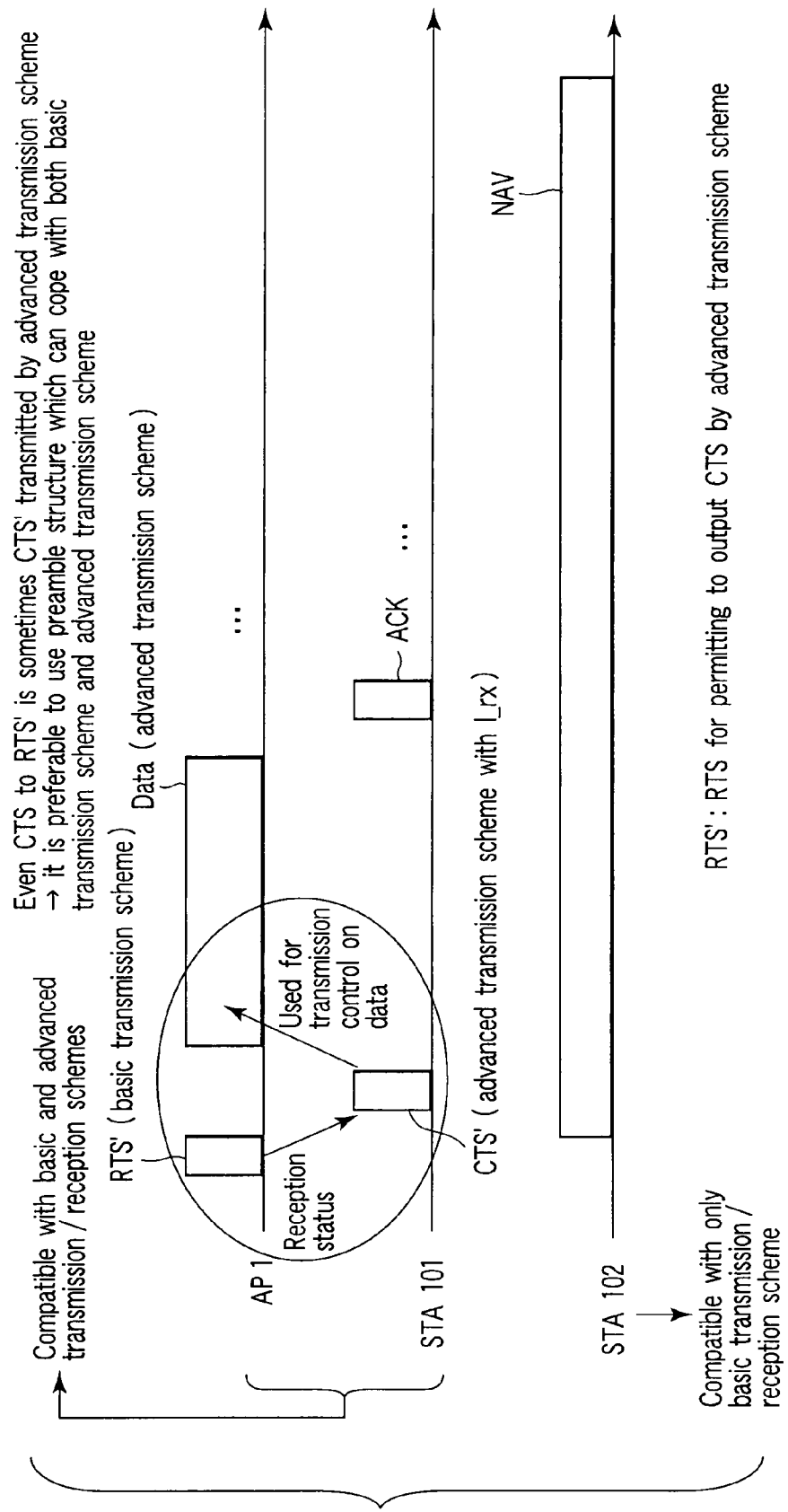
F I G. 13

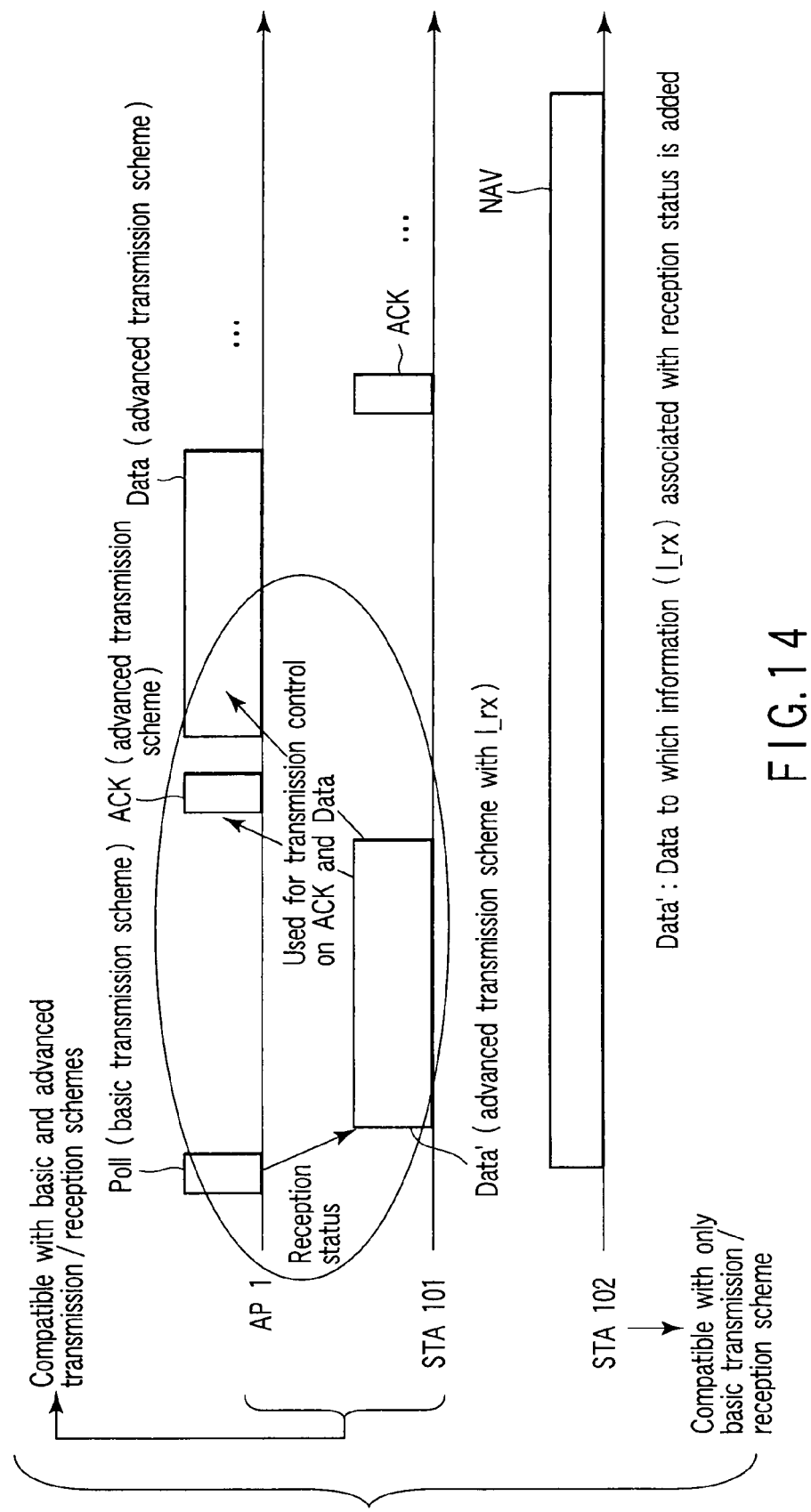
F I G. 14

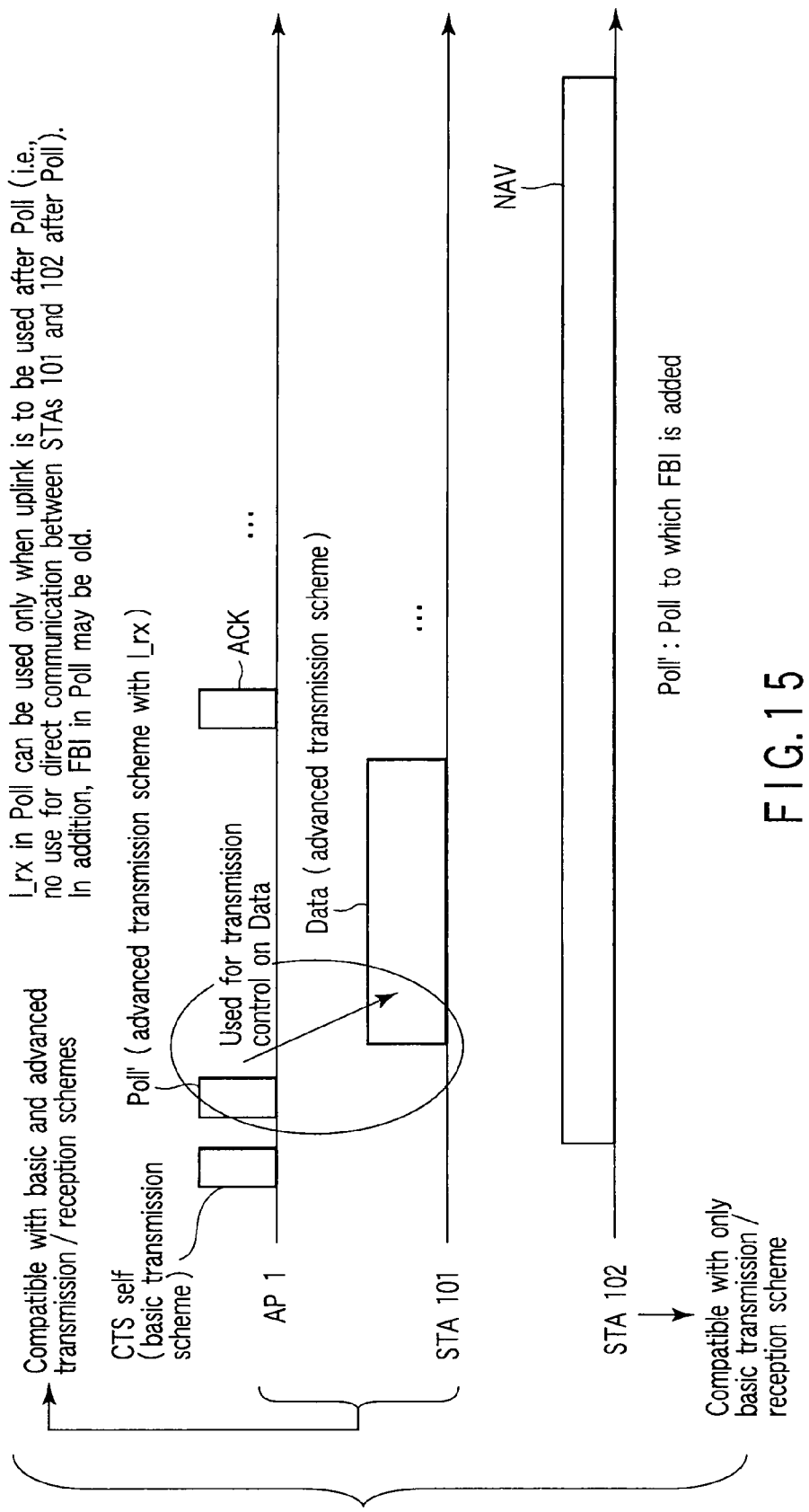
F I G. 15

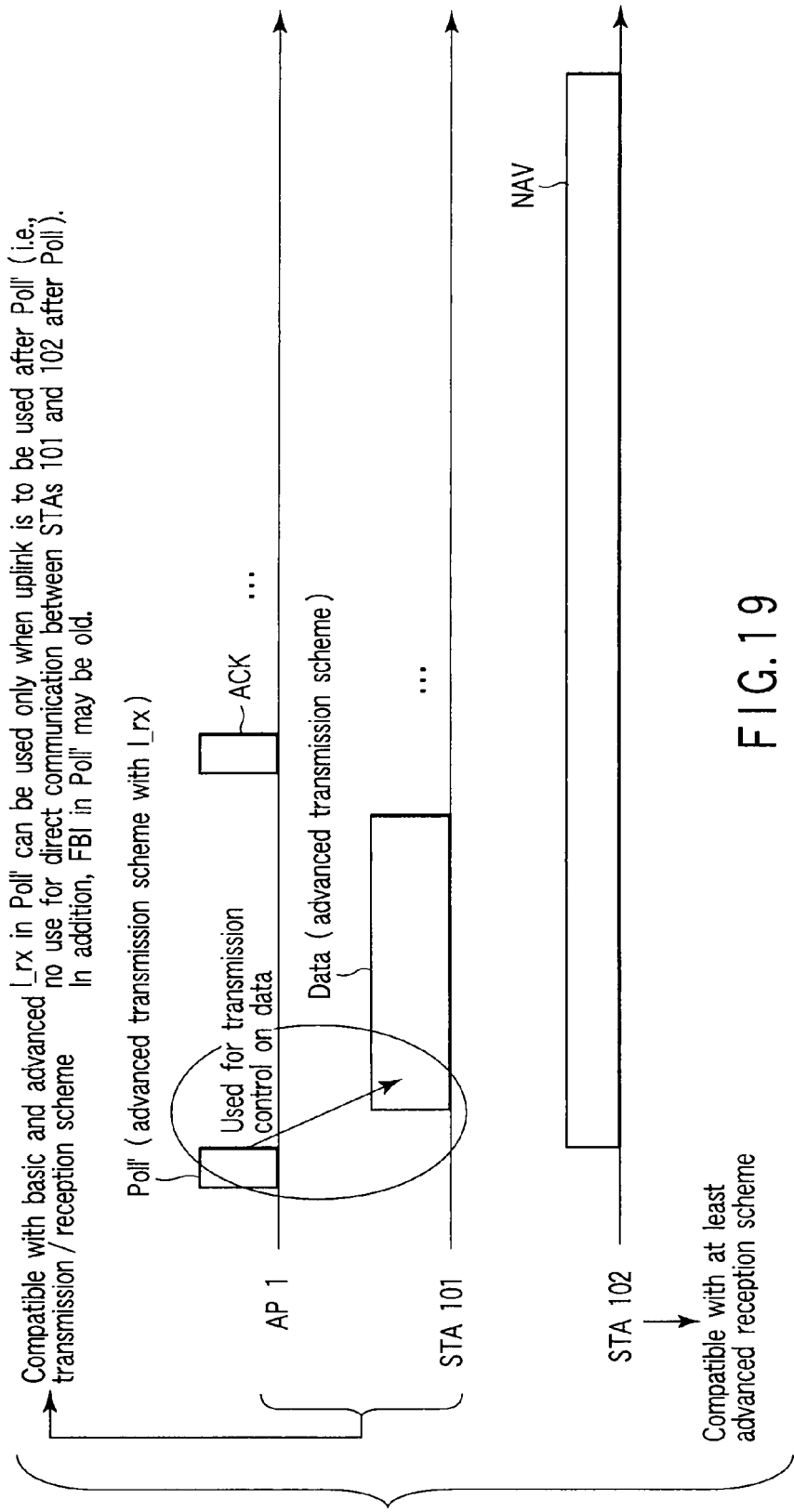
F I G. 19

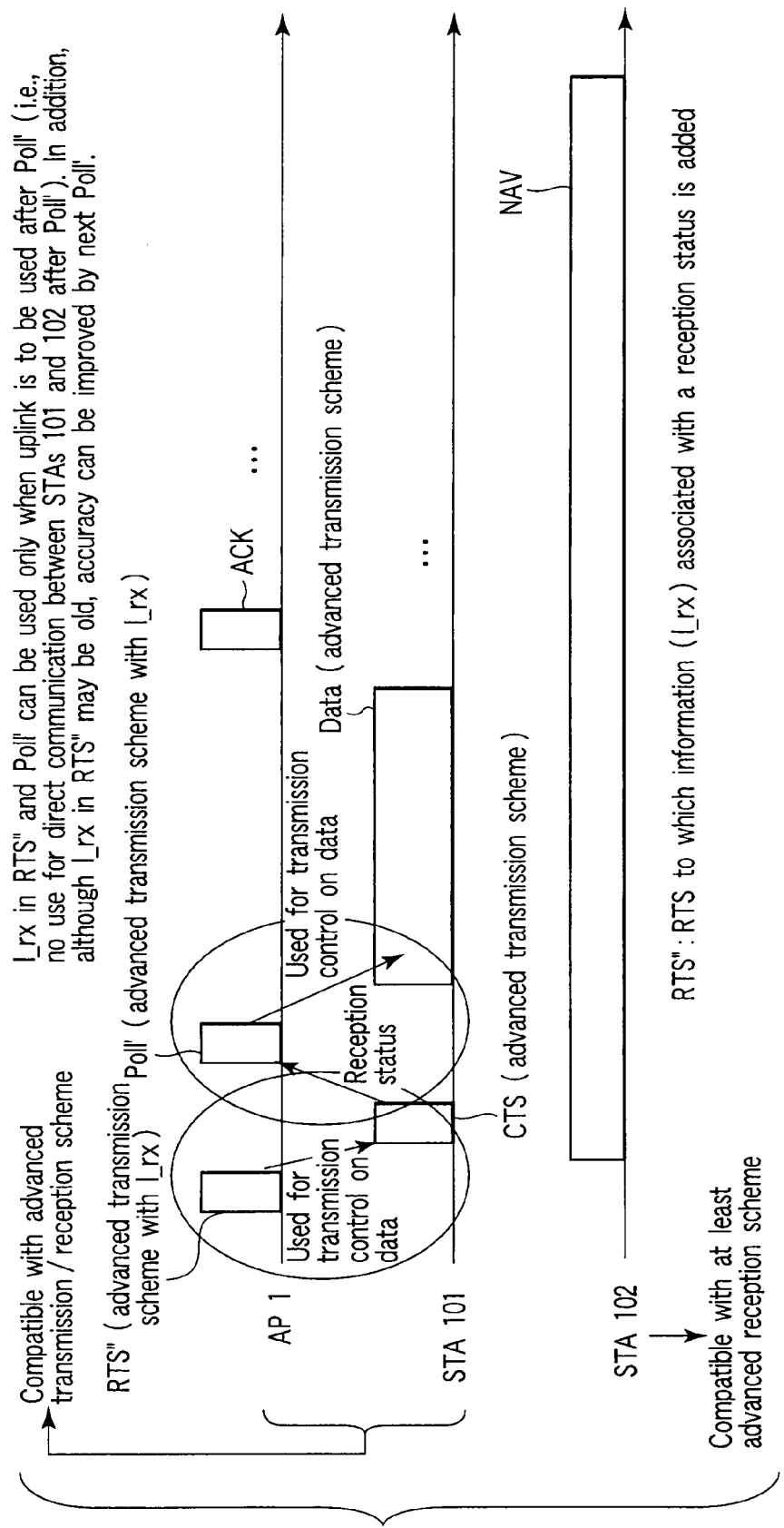
F I G. 21

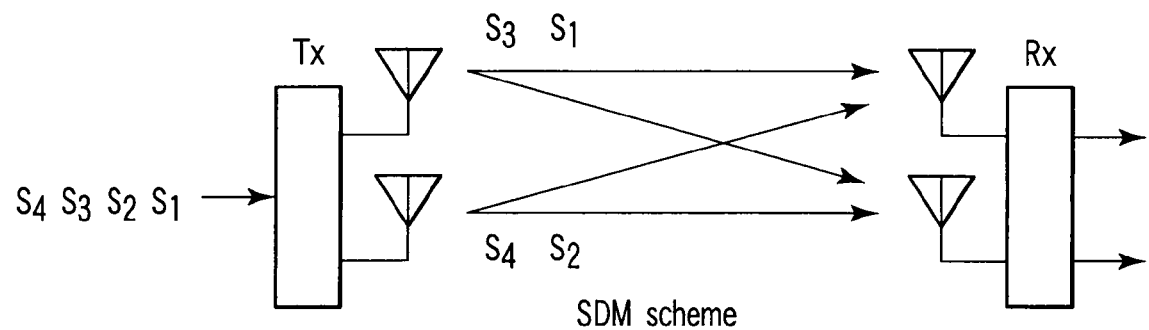
F I G. 2 5 A
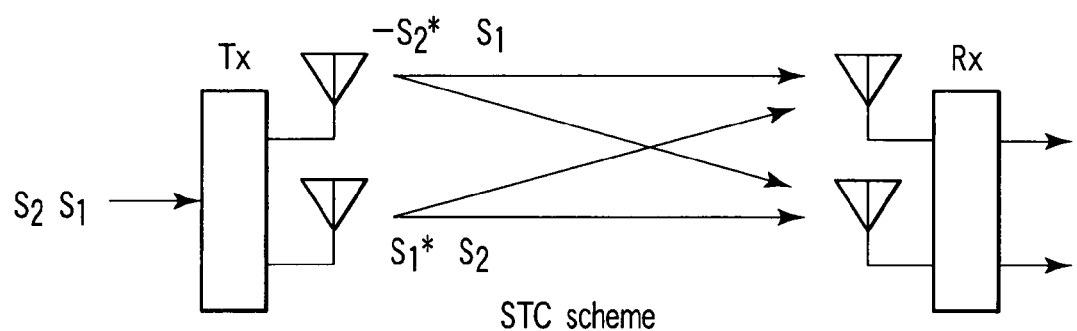
F I G. 2 5 B

WIRELESS COMMUNICATION SYSTEM AND WIRELESS TERMINAL

CROSS-REFERENCE TO RELATED APPLICATIONS

This application is a divisional of U.S. application Ser. No. 11/137,661, filed May 26, 2005 and is based upon and claims the benefit of priority from prior Japanese Patent Applications No. 2004-160175, filed May 28, 2004; and No. 2004-173139, filed Jun. 10, 2004, the entire contents of each of which are incorporated herein by reference.

BACKGROUND OF THE INVENTION

1. Field of the Invention

The present invention relates to a wireless communication system and wireless terminal in the wireless communication system which performs transmission on the basis of carrier sense.

2. Description of the Related Art

In a wireless communication system which periodically ensures a transmission slot, a given wireless terminal executes a sequence of notifying another wireless terminal of the reception status of the given wireless terminal, the state of a wireless link estimated by reception processing, or transmission control information.

For example, in a cellular system used for cellular phones, a wireless base station periodically receives feedback information from a wireless terminal to transmit data to the wireless terminal by performing transmission control such as optimal rate selection or transmission power control.

Among wireless communication systems designed to acquire a transmission slot by carrier sense, there are also known a wireless communication system and wireless terminal, in which when a given wireless terminal receives data from another wireless terminal, the given wireless terminal generates information as an individual data frame, such as the reception status of the given wireless terminal and the designation of a transmission rate for the destination wireless terminal, which influences transmission control on the destination wireless terminal, and transmits the data frame to the destination wireless terminal.

In a wireless communication system which periodically ensures a transmission slot, a transmission slot for notifying a wireless terminal to which data is transmitted of feedback information is ensured, and hence no contention for a transmission slot occurs between the wireless terminal and another wireless terminal. This makes it unnecessary to perform transmission timing control for ensuring a stable notification. In contrast to this, in a wireless communication system which acquires a transmission slot by carrier sense, feedback information needs to be transmitted with contention with other wireless terminals.

In the sequence of transmitting feedback information in a conventional wireless communication system designed to perform carrier sense, since feedback information itself is transmitted as individual data upon carrier sense under contention with other wireless terminals, feedback information cannot be stably and efficiency notified. In addition, a receiving wireless terminal cannot timely notify the transmitting wireless terminal of feedback information in accordance with the timing of need for the feedback information in transmission by the transmitting wireless terminal.

Assume that, in particular, a wireless communication system designed to perform carrier sense simultaneously includes wireless terminals which use different modulation schemes or differ in handling of transmission antenna configurations, e.g., using a reception scheme matching transmission from a single antenna or a reception scheme matching transmission from a plurality of antennas. In this case, even if a frame containing channel reservation information is transmitted in advance so as to prevent contention for a predetermined period of time, no effect is produced on a wireless terminal incapable of decoding the frame.

BRIEF SUMMARY OF THE INVENTION

The present invention is directed to allow a wireless terminal to stably, efficiently, and timely notify another wireless terminal of the reception status of the wireless terminal, a transmission channel characteristic estimated by reception processing, and transmission control information in a wireless communication system designed to perform transmission on the basis of carrier sense.

A wireless communication system according to an aspect of the present invention includes first and second wireless terminals capable of performing transmission by at least one of a first transmission scheme and a second transmission scheme. The first wireless terminal performs transmission of a first frame to the second wireless terminal by using the second transmission scheme. The second wireless terminal communicates with the first wireless terminal to notify the first wireless terminal of information associated with a status of the reception of the first frame transmitted from the first wireless terminal by using the first transmission scheme.

BRIEF DESCRIPTION OF THE SEVERAL VIEWS OF THE DRAWING

FIG. 5 is a view for explaining frame exchange according to the first embodiment;

FIG. 6 is a view for explaining frame exchange according to the second embodiment of the present invention;

FIG. 13 is a view for explaining another frame exchange according to the sixth embodiment;

FIG. 14 is a view for explaining still another frame exchange according to the sixth embodiment;

FIG. 15 is a view for explaining still another frame exchange according to the sixth embodiment;

FIG. 19 is a view for explaining frame exchange according to the ninth embodiment of the present invention;

FIG. 21 is a view for explaining still another frame exchange according to the ninth embodiment;

FIGS. 25A and 25B are views for explaining a system designed to perform transmission by using a plurality of antennas according to the sixth embodiment of the present invention.

DETAILED DESCRIPTION OF THE INVENTION

The embodiments of the present invention will be described below with reference to the views of the accompanying drawing.

As a wireless communication system designed to perform carriers sense, a wireless LAN system is available, which is based on IEEE Std. 802.11-1999 (revision 2003 includes ISO/IEC 8802-11: 1999(E) ANSI/IEEE Std 802.11, 1999 edition, IEEE Std 802.11a-1999, IEEE Std 802.11b-1999, IEEE Std 802.11b-1999/Cor 1-2001, and IEEE Std 802.11d-2001). This system will be described below on the basis of the basic system arrangement of an IEEE 802.11 wireless LAN system. The IEEE 802.11 standard specifications are specifications associated with a PHY (physical) layer and MAC (Medium Access Control) layer. Note that the IEEE 802.11 standard specifications described here include amendments, recommended practices, and the like of the IEEE 802.11 standard specifications.

(First Embodiment)

Figure 1:
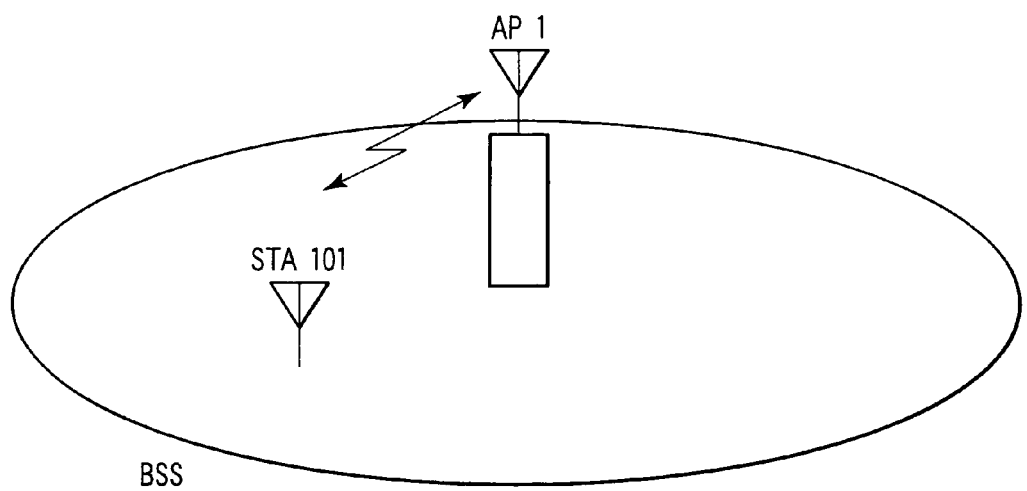
FIG. 1 is a view for explaining a wireless communication system comprising one wireless base station and one wireless terminal according to the first embodiment of the present invention.

FIG. 1 shows an example in which an IEEE 802.11 wireless LAN system used in the present invention takes a communication form in which one wireless terminal (STA) 101 is wirelessly connected to one wireless base station (AP) 1. According to IEEE 802.11, a constituent unit comprising one wireless base station and one or more wireless terminals is called a BSS (Basic Service Set).

Figure 2:
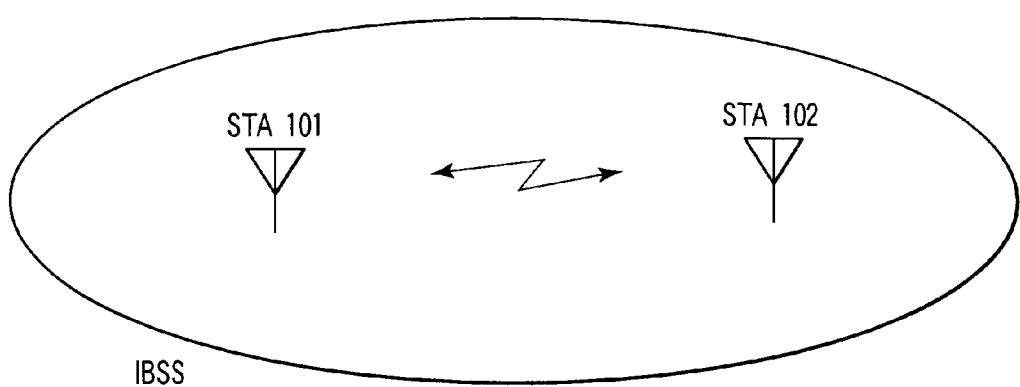
FIG. 2 is a view showing an example of the arrangement of another wireless communication system according to the first embodiment.

Although a case wherein the wireless base station 1 transmits data to the wireless terminal 101 will be described, the present invention can also be applied to a case wherein data is transmitted from the wireless terminal 101 to the wireless base station 1. The present invention can also be applied to a case wherein another wireless terminal 102 exists in the BSS in FIG. 1, and data is transmitted from the wireless terminal 101 to the wireless terminal 102. This system may take an arrangement, in place of that shown in FIG. 1, in which no wireless base station exists and the two wireless terminals 101 and 102 having similar communication capabilities perform wireless communication, as shown in FIG. 2. According to IEEE 802.11, a unit comprising only wireless terminals without any wireless base station is called an IBSS (Independent Basic Service Set). The present invention can also be applied to a case wherein the system takes an arrangement like that shown in FIG. 2 by replacing a situation in which data is transmitted from the wireless base station 1 to the wireless terminal 101 with the following situation in which data is transmitted from one wireless terminal, e.g., the wireless terminal 101, to another wireless terminal (a wireless terminal 102 in this case).

Figure 3:
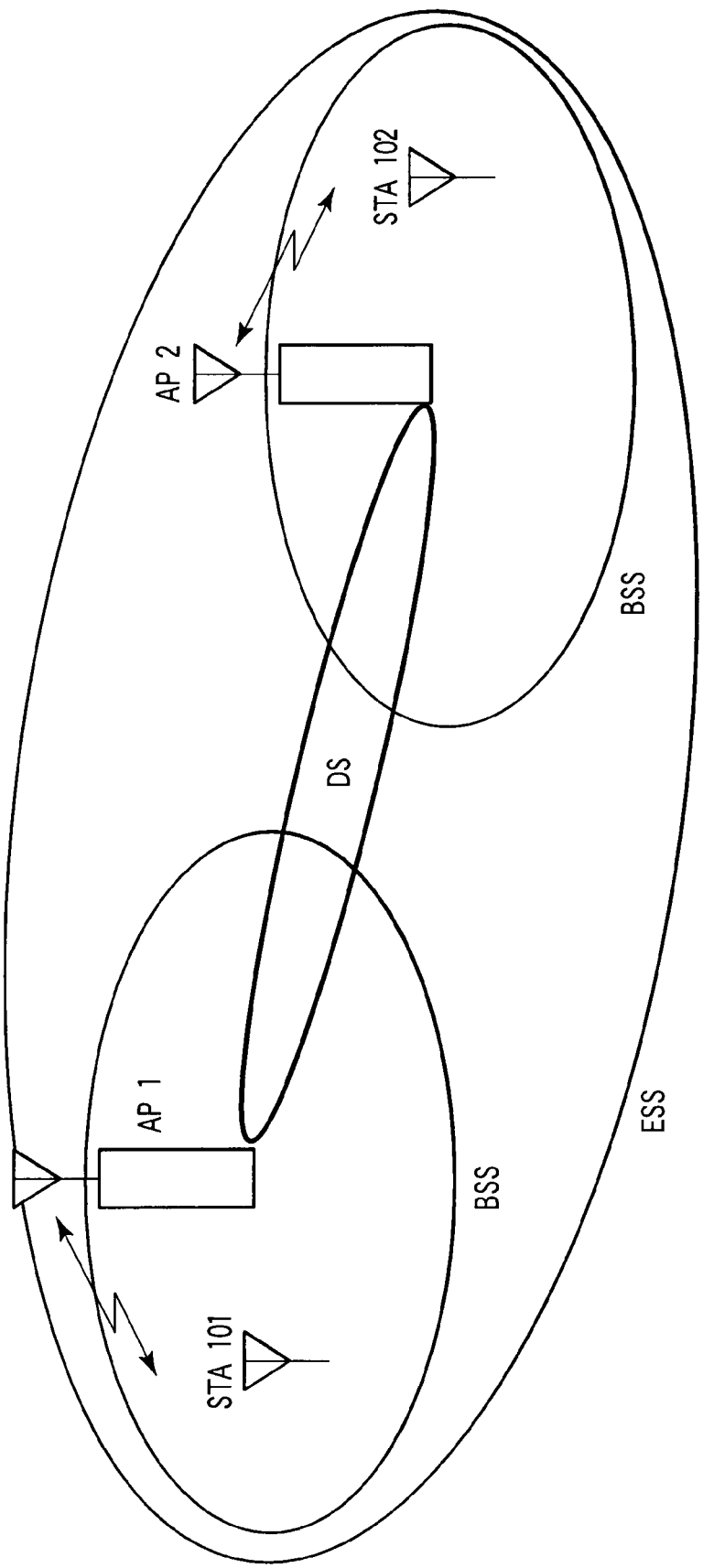
FIG. 3 is a view showing an example of the arrangement of still another wireless communication system according to the first embodiment.

Although FIG. 1 shows a wireless communication system comprising only one BSS, the system may comprise a plurality of BSSs as shown in FIG. 3. A constituent unit of such wireless communication system is called an ESS (Extended Service Set) in IEEE 802.11. Wireless base stations may be connected to each other through a DS (Distributed System) which may be a wired or a wireless infrastructure. The present invention may take a form in which the following processing is executed in only one BSS or a limited number of BSSs among the plurality of BSSs in this wireless communication system.

Frames exchanged between the wireless base station 1 and the wireless terminal 101 include, for example, a data frame formed from a payload (e.g., an Ethernet frame) transferred from an upper LLC (Logical Link Control) layer to a MAC layer, a management frame used for management between terminals or for a BSS at the MAC layer level, and a control frame used for control or the like to be performed when data frames or management frames are exchanged. In this case, both a data frame and a management frame will be referred to as data so as to be roughly discriminated from control frames.

In addition, assume that transmission schemes used in BSSs are classified into two types. For example, one is a basic transmission scheme which needs to cope with transmission/reception in a BSS without fail, and another is an advanced transmission scheme prepared as an extended function. A transmission scheme represents, for example, a modulation scheme. Both 802.11b and 802.11g are standards targeted to a 2.4 GHz band. 802.11g has backward compatibility with 802.11b such that the modulation scheme defined in 802.11g cannot be used in a wireless terminal (including a wireless base station) based on 802.11b, but the modulation scheme defined in 802.11b can cope with a wireless terminal based on 802.11g. In this case, the modulation scheme defined in 802.11b is a basic transmission scheme, and the modulation scheme defined in 802.11g is an advanced transmission scheme. When a transmission scheme defined by the same standard is used, e.g., even if only a wireless terminal based on 802.11g is accommodated in a BSS, a beacon frame or probe response frame of a management signal directed to establish synchronization in a BSS contains a modulation scheme set (to be referred to as an operation rate set) which guarantees at least reception in the BSS. Since all the modulation schemes defined by the standards need not be contained in such a frame, transmission schemes can also be classified into a modulation scheme set notified as an operational rate set as a basic transmission scheme and an advanced transmission scheme which is defined by the standards but is not contained in a current operational rate set. The transmission schemes may be classified by not only modulation schemes but also coding rates. Furthermore, the transmission schemes may be classified by a modulation and coding scheme (MCS).

When the wireless base station 1 is to transmit a data frame to the wireless terminal 101, an RTS (Request to Send) frame which is a control frame is transmitted first. In this case, the RTS frame is transmitted by the basic modulation scheme. An RTS frame is transmitted before a data frame to reserve a channel virtually.

Figure 4:
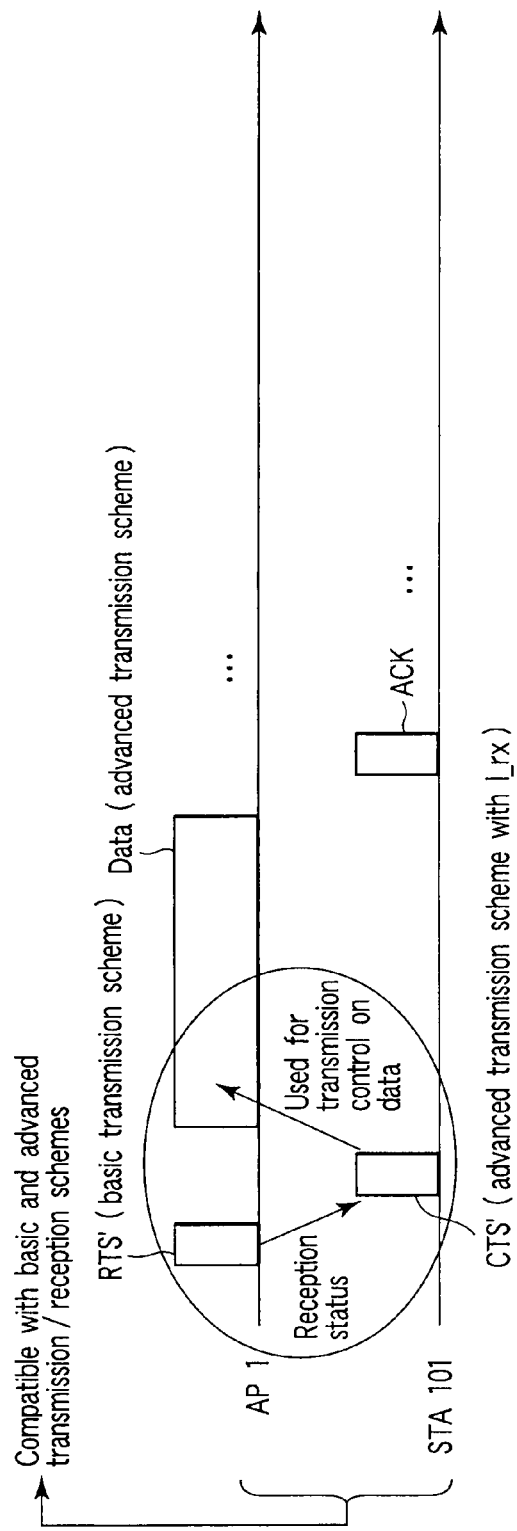
FIG. 4 is a view for explaining the arrangement of a typical MAC frame in IEEE 802.11.

FIG. 4 shows the arrangement of a MAC frame in an IEEE 802.11 wireless LAN system. The MAC frame comprises a MAC header portion in which information necessary for frame reception processing is set, a frame body portion in which, for example, data transferred from the upper LLC layer is set, and an FCS (Frame Check Sequence) portion comprising a 32-bit CRC (Cyclic Redundancy Code) used to determine whether or not a MAC header portion and frame body portion have been properly received. In accordance with the type of frame, the MAC header portion includes a frame control field, a duration/ID field which indicates a period (NAV: Network Allocation Vector) during which transmission for the execution of virtual carrier sense (leading to the execution of virtual channel reservation) is inhibited, and an ID (AID: Association Identifier) of a wireless terminal allocated to the wireless base station, MAC address fields in which the MAC addresses of a direct transmission destination, final destination, and transmission source are written, a sequence control field in which the sequence number of data to be transmitted or the fragment number obtained when fragmentation is performed is set, and the like. The frame control field includes, for example, a type field or subtype field which indicates the type of frame, a ToDS bit indicating whether the frame is addressed to the DS (i.e., the wireless base station), and a FromDS bit indicating whether the frame is transmitted from the DS (i.e., the wireless base station).

In order to execute virtual channel reservation by using this duration/ID field, a frame having the field itself must be received. An RTS frame is therefore transmitted by the basic modulation scheme.

According to IEEE 802.11, when the wireless terminal 101 which is a transmission destination of the RTS frame receives the RTS frame, the wireless terminal 101 returns a CTS (Clear to Send) frame of a control frame, which is a response frame to the RTS frame, to the wireless base station 1. This makes it possible to perform virtual channel reservation with respect to wireless terminals around the wireless base station 1 and the wireless terminal 101. In general, when another wireless terminal exists in the same BSS, the transmission of an RTS frame from the wireless base station 1 will prevent the another wireless terminal from interfering with the transmission of data from the wireless base station 1 afterward. Therefore, a CTS frame can be transmitted by the advanced transmission scheme. In this embodiment, information (I_rx) associated with the reception status of an RTS frame at the wireless terminal 101 is added to the CTS frame transmitted by the advanced transmission scheme. Upon receiving the information associated with the reception status, the wireless base station 1 can use the information for the next transmission. FIG. 5 shows this series of operations.

In this case, when a CTS frame is to be transmitted by the advanced transmission scheme, the lowest transmission rate of the transmission rates which can be used in the advanced transmission scheme is used. The reason why the lowest transmission rate is used is that error tolerance in propagation is higher than when a higher transmission rate is used. Assume that the lowest transmission rate is used. In this case, even if the state of a wireless link to a wireless terminal to which an RTS frame has been transmitted by the basic transmission scheme is poor, selecting the lowest transmission rate for a CTS frame to be transmitted by the advanced transmission scheme makes it possible to transmit the frame upon improving the reliability of transmission to the RTS frame transmitting side.

It suffices to select the most robust transmission method of candidates used in the advanced transmission scheme instead of using the lowest transmission rate. Robust transmission methods are transmission methods designed to perform, for example, coding with error correcting capability. Of these transmission methods, a method with the highest error correcting capability is selected.

When information associated with a reception status is added to a CTS frame, the frame is handled as a new frame, and hence the above "Subtype" may be defined differently. Referring to FIG. 5, therefore, this frame is written as "CTS'".

Information associated with a reception status may be notified by using some fields of an existing format or some bits in a field instead of adding a new field to the format of a frame. In addition, this field may be a field in a MAC frame but is not limited to this. For example, a field in a PHY header may be used. A PHY header in DSSS (Direct Sequence Spread Spectrum) in IEEE 802.11 or in OFDM (Orthogonal Frequency Division Multiplexing) in IEEE 802.11a includes, for example, a service field. Part (OFDM PHY) or all (DSSS PHY) of this field is reserved for future use, and is not defined. Such a portion may be used to notify information associated with a reception status. When this information is to be used at the MAC layer of the wireless terminal on the receiving side of the information, it suffices if there is a mechanism of notifying the information from the PHY layer to the MAC layer or a mechanism of allowing the MAC layer to read at least part of the information extracted/stored at the PHY layer which is associated with the information. This embodiment can also be applied in the same manner to a case wherein information associated with a reception status is set in another frame.

This embodiment can be effectively used by allowing the wireless terminal 101 notify the wireless base station 1 of the communication capability of the wireless terminal 101, e.g., a capability of receiving and transmitting signals based on the advanced transmission scheme by performing authentication processing using a management frame between the wireless terminal 101 and the wireless base station 1 and a function of transmitting information associated with a reception status. For example, in an IEEE 802.11 wireless LAN system, the communication capability of a wireless terminal can be notified by using a field called a capability information field. Since this field is set in, for example, an association request frame which is a management frame, the communication capability of a wireless terminal can be notified to a wireless base station. In addition, this field is set in beacon or probe response frames which are management frames. The beacon frame is periodically transmitted. The probe response frame is a frame to be returned as a response when a probe request frame as a management frame is received from a wireless terminal. Using these frames allows a wireless terminal to grasp the communication capability of a wireless base station. Since beacon and probe request frames are also transmitted from an IBSS, using these frames allows the terminal to grasp the communication capacities of other wireless terminals in an IBSS. Capability Information field is used to notify whether if the terminal or the base station can receive the signal based on the advanced transmission scheme. Capability Information field is used to notify that whether if the terminal or the base station can transmit the signal based on the advanced transmission scheme. Capability Information field is also used to notify whether if the terminal or the base station can transmit the signal based on the advanced transmission scheme. Capability Information field is also used to notify whether if the terminal or the base station can transmit the information of the reception status.

In contrast, by transmitting an RTS frame by the advanced transmission scheme and transmitting a CTS frame, to which information associated with a reception status is added, by the basic transmission scheme, another wireless terminal which is compatible with only the basic transmission scheme can set NAV, thereby obtaining the same effect as that described above.

When the combination of the applied and basic transmission schemes is changed depending on whether an RTS frame or CTS frame is to be transmitted, the reliability of transmission to a transmission destination wireless terminal (including a wireless base station) can be improved by causing the side where transmission is performed by the advanced transmission scheme to select the lowest transmission rate of the transmission rates in the advanced transmission scheme or to select the most robust transmission method of the transmission methods used in the advanced transmission scheme.

Since all the wireless terminals in a BSS can start to communicate after performing authentication and association processing with respect to a wireless base station in the BSS, it can be assumed that the wireless base station is connected to all the wireless terminals in the BSS. Therefore, all the wireless terminals in the BSS can receive frames transmitted by the wireless base station. In this case, that a wireless terminal can receive a frame does not mean that the terminal can decode the frame, but means that the reception status of the terminal is at a level that allows the terminal to decode the frame if it has a decoding capability. That is, any wireless terminal is not necessarily required to have a decoding capability. When an RTS frame is transmitted from the wireless terminal 101 by the advanced transmission scheme, the wireless base station 1 transmits a CTS frame (CTS'), to which information associated with a reception status is added, by the basic transmission scheme. If a wireless base station always uses the basic transmission scheme to transmit information associated with a reception status upon adding it to a response frame to a frame transmitted from a wireless terminal by the advanced transmission scheme, at least all the wireless terminals in the BSS can perform reception/decoding operation and channel reservation by NAV using the frame. The wireless terminal can therefore start to perform frame exchange by using a desired transmission scheme without being conscious of causing neighboring wireless terminals which are only capable of performing reception/decoding operation by the basic transmission scheme to perform NAV setting.

In contrast, making the wireless base station 1 always use the basic transmission scheme to transmit an RTS frame allows the wireless terminal 101 which transmits a CTS frame to respond to the RTS frame by using a desired transmission scheme without being conscious of causing neighboring wireless terminals which are only capable of performing reception processing by the basic transmission scheme to perform NAV setting.

In this manner, when frame exchange is to be performed between a wireless base station and a wireless terminal, the wireless base station 1 can perform channel reservation with respect to at least other wireless terminals in the BSS by using the basic transmission scheme, thereby ensuring stable communication.

When the basic transmission scheme and advanced transmission scheme are to be selectively used in the above manner in accordance with the role/function of a terminal which is to perform transmission, the transmitting terminal which performs transmission by using the advanced transmission scheme may select the lowest transmission rate of the transmission rates set in the transmission scheme. Alternatively, the terminal may select the most robust transmission method of the methods in the advanced transmission scheme. This makes it possible to perform transmission upon improving the reliability of transmission to a transmission destination wireless terminal (including a wireless base station) in the same manner as described above.

In data transmission, in some cases, a plurality of data are consecutively transmitted while Ack frames which are control frames are received as responses. For example, when data or a management frame is to be transmitted from a given LLC, the data or frame is divided into fragments (fragmentation). In addition, the IEEE 802.11e standard and the like which handle QoS allow consecutive transmission of different data. In such a case, the first data may be transmitted by the basic transmission scheme, and an Ack frame (e.g., Block Ack) as a response may be transmitted by the advanced transmission scheme after information associated with a reception status is added to the frame.

Assume that when data and an Ack frame as a response to the data are to be exchanged, the transmitting side using the advanced transmission scheme, e.g., the Ack frame transmitting side, uses the advanced transmission scheme. In this case, selecting the lowest transmission rate of the transmission rates in the advanced transmission scheme or selecting the most robust transmission method of the methods in the advanced transmission scheme makes it possible to perform transmission to a transmission destination wireless terminal (including a wireless base station) upon improving the reliability of transmission.

In addition, while data and Ack frames are exchanged by the advanced transmission scheme after the exchange of the preceding RTS and CTS' frames, each Ack may be transmitted after information associated with a reception status is added to the Ack frame. FIG. 5 additionally shows this state.

When information associated with a reception status is added to an Ack frame, the frame is handled as a new frame, and "Subtype" described above may be defined independently. For this reason, this frame is written as "Ack'". In an application of IEEE 802.11e "Block Ack", a Block Ack frame which is a response to burst transmission data is written simply by "Ack", and a Block Ack frame to which information (I_rx) associated with a reception status is added is written by (Ack').

Assume that when, for example, RTS and CTS frames are not exchanged, an Ack frame to data is transmitted after information associated with a reception status is added to the frame. In this case, even if the data is transmitted by the advanced transmission scheme and the Ack frame (Ack') to which the information associated with the reception status is added is transmitted by the basic transmission scheme in contrast to the above operation, the duration/ID field of the Ack' allows another wireless terminal which is compatible with only the basic transmission scheme to set NAV, thereby obtaining the same effects as those described above.

As described above, in exchanging frames, the basic transmission scheme and advanced transmission scheme may be selectively used in the following manner in accordance with the role/function of a terminal. When a wireless base station is to transmit data, the first data is transmitted by the basic transmission scheme, and a wireless terminal transmits an Ack frame as a response to the data by the advanced transmission scheme upon adding information associated with a reception status. When a wireless terminal is to transmit data, the first data is transmitted by the advanced transmission scheme, and a wireless base station transmits an Ack frame as a response to the data by the advanced transmission scheme upon adding information associated with a reception status.

As described above, when the basic transmission scheme and advanced transmission scheme are to be selectively used, in exchanging data and an Ack frame as a response to the data, in the above manner in accordance with the role/function of a terminal which is to perform transmission, the transmitting terminal which performs transmission by using the advanced transmission scheme may select the lowest transmission rate of the transmission rates set in the transmission scheme. Alternatively, the terminal may select the most robust transmission method of the methods in the advanced transmission scheme. This makes it possible to perform transmission upon improving the reliability of transmission to a transmission destination wireless terminal (including a wireless base station) in the same manner as described above.

According to the above description, the lowest transmission rate is selected from the transmission rates in the advanced transmission scheme or the most robust transmission method is selected from the robust methods in the advanced transmission scheme. These operations are, however, based on the premise that a wireless terminal on the receiving side can decode the frames transmitted in accordance with said transmission schemes.

The combination of a control frame or data and a control frame as a response to the frame or data is not limited to the above example, and may be applied to another frame type.

As described above, in the combination of the basic transmission scheme and advanced transmission scheme, adding information associated with a reception status to a transmission frame in one of the schemes allows a wireless communication system which performs transmission based on carrier sense to stably and efficiently notify a wireless terminal on the data transmitting side of the information associated with the reception status of the wireless terminal under channel reservation upon improving the reliability of frame exchanges. In addition, this allows the wireless terminal on the data transmitting side to use the information for the next transmission.

When frames are to be exchanged between a wireless base station and a wireless terminal, the basic transmission scheme and advanced transmission scheme are selectively used in accordance with the role/function of the transmitting terminal to allow the wireless terminal (which is not the wireless base station) to start frame exchange by using a desired transmission scheme or make a response to the data without being conscious of causing neighboring wireless terminals which are capable of performing only reception processing based on the basic transmission scheme to perform NAV setting.

(Second Embodiment)

The second embodiment is similar to the first embodiment, and hence a different point between them will be mainly described below. The second embodiment differs from the first embodiment in that permission information for permitting the transmission of a response frame by the advanced transmission scheme is added to a frame as a source of the response frame. A wireless communication system has the same arrangement as that shown in FIG. 1.

In the first embodiment, it is assumed that when an RTS frame is transmitted by the basic transmission scheme, a CTS frame (CTS') is transmitted by the advanced transmission scheme. In some cases, however, it is not preferable to transmit CTS' by the advanced transmission scheme when, for example, the reception status of the wireless terminal 101 for an RTS frame is poor. For this reason, information for permitting the selection of the advanced transmission scheme for a CTS frame as a response may be set as additional information in an RTS frame. This makes it possible to give some degree of freedom to the selection of a transmission scheme when the wireless terminal 101 is to transmit a response frame. FIG. 6 shows a case wherein the wireless terminal 101 has transmitted a CTS' frame by the advanced transmission scheme in response to an RTS frame. Assume that frame exchange is to be performed between a wireless base station and a wireless terminal in the first embodiment. In this case, when the wireless base station is to transmit an RTS, the station selects the basic transmission scheme. The wireless terminal then transmits a CTS response by the advanced transmission scheme. In contrast, when the wireless terminal is to transmit an RTS frame, the terminal selects the advanced transmission scheme. The wireless base station then transmits a CTS response by the basic transmission scheme. In the former case, information for permitting the selection of the advanced transmission scheme for a CTS frame as a response is set as additional information in an RTS frame transmitted by the wireless base station. In the latter case, the wireless terminal transmits an RTS frame by the advanced transmission scheme, whereas the wireless base station responds to the frame by the basic transmission scheme. The wireless terminal therefore waits for the response transmitted by the basic transmission scheme.

Adding information for permitting the selection of the advanced transmission scheme for a CTS frame to an RTS frame makes the RTS frame be handled as a new frame. That is, "Subtype" described above may be defined independently. Referring to FIG. 6, therefore, this frame is written as "RTS'".

This makes it possible to give some degree of freedom to the selection of a transmission scheme in transmitting a response frame under circumstances where the response frame is expected to be transmitted by the basic transmission scheme.

(Third Embodiment)

Since the third embodiment is similar to the first embodiment, a different point between them will be mainly described below. Unlike in the first embodiment, in the third embodiment, the present invention is not limited to the combination of a transmission frame and a response frame thereto, with information associated with a reception status being added to the response frame.

Figure 7:
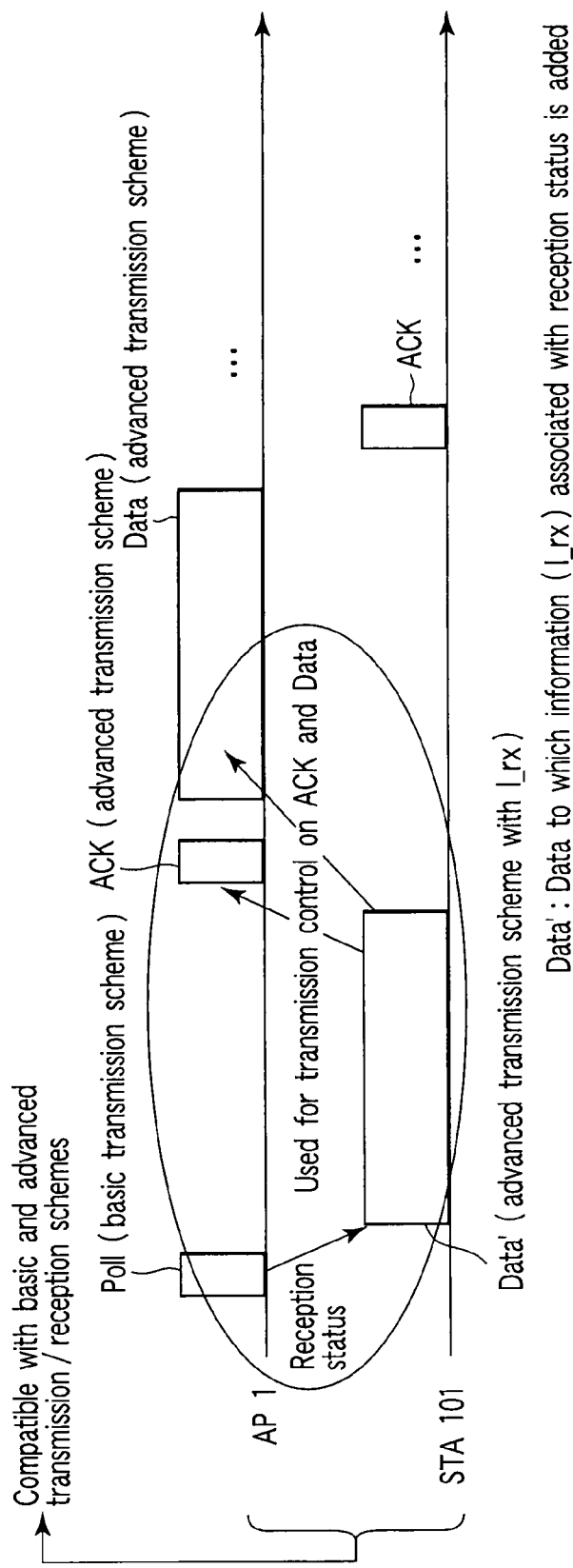
FIG. 7 is a view for explaining frame exchange according to the third embodiment of the present invention.

Even if the combination of a transmission frame and a response frame thereto is not used, the present invention can be applied to a case wherein frames are consecutively exchanged. Assume that the arrangement of the wireless communication system shown in FIG. 1 is used. In this case, as shown in FIG. 7, when a wireless terminal 101 acquires a transmission right from a wireless base station 1 through a Poll frame (e.g., a CF-Poll in 802.11 or a QoS CF-Poll frame in 802.11e) and is to transmit a data frame, the terminal adds information (I_rx) associated with a reception status to the frame. When transmitting an Ack as a response frame to the wireless terminal 101 or transmitting a data frame to the wireless terminal 101, the wireless base station 1 uses the information associated with the reception status of the wireless terminal 101 for transmission control.

When information associated with a reception status is added to a data frame, the frame is handled as a new frame, and "Subtype" described above may be defined independently. For this reason, this frame is written as "Data'" in FIG. 7.

As described above, the same effects as those of the first embodiment can be obtained even if present invention is not limited to the combination of a transmission frame and a response frame thereto, with information associated with a reception status being added to the response frame.

(Fourth Embodiment)

Since the fourth embodiment is basically the same as the first or second embodiment, a different point between the fourth embodiment and the first and second embodiments will be mainly described below. The fourth embodiment differs from the first or second embodiment in that the same wireless terminal performs channel reservation first and then transmits a frame to which information associated with a reception status is added.

Figure 8:
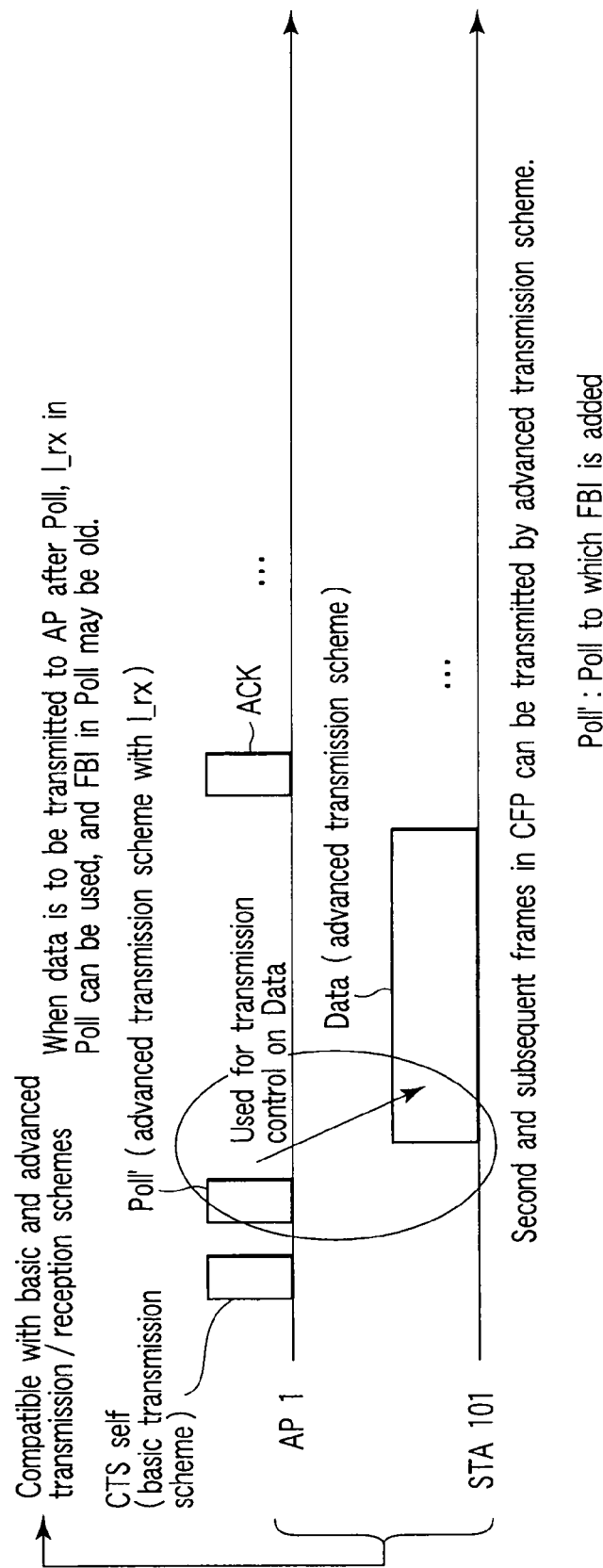
FIG. 8 is a view for explaining frame exchange according to the fourth embodiment of the present invention.

This point will be described with reference to FIG. 8. The arrangement of a wireless communication system is the same as that shown in FIG. 1. A wireless base station 1 transmits first a dummy frame addressed to itself by the basic transmission scheme to make another wireless terminal reserve a channel. Referring to FIG. 8, the CTS self frame (CTS frame addressed to itself) used in 802.11e or 802.11g is transmitted. Thereafter, in a NAV period, the wireless base station 1 transmits a Poll frame to the wireless terminal 101 to give it a transmission right. The Poll frame is transmitted by the advanced transmission scheme. At this time, information associated with a reception status is added to the frame on the basis of the frame previously received from the wireless terminal 101. When the wireless terminal 101 to which the transmission right has been given by the Poll frame transmits a data frame to the wireless base station 1 by the advanced transmission scheme, the wireless terminal 101 can perform transmission control by using the information associated with the reception status of the wireless base station 1. In this case, there is a limitation that the information associated with the reception status of the wireless base station 1 can be used only when the wireless terminal 101 to which the Poll frame has been transmitted transmits a frame to the wireless base station 1, i.e., only when uplink transmission is performed. According to IEEE 802.11, a Poll frame indicates a CF-Poll frame, QoS CF-Poll frame, PS-Poll frame, or the like in a strict sense.

Referring to FIG. 8, although the CTS self frame is used, a QoS CF-Poll frame (a QoS CF-Poll frame addressed to itself) used in 802.11e or the like may be transmitted instead.

In these cases, when a Poll frame is to be transmitted by the advanced transmission scheme, the lowest transmission rate of the transmission rates in the advanced transmission scheme which can be used is to be used. The reason why the lowest transmission rate is used is that error tolerance (robustness) in propagation is higher than when a higher transmission rate is used. Even if the state of a wireless link to a wireless terminal to which a Poll frame has been transmitted is poor, using the lowest transmission rate for a Poll frame to be transmitted by the advanced transmission scheme makes it possible to transmit the Poll frame upon improving the reliability of transmission to the Poll frame transmission destination.

Alternatively, of the candidate methods used in the advanced transmission scheme, the most robust transmission method may be selected instead of the lowest transmission rate. A robust transmission method is the one described in the first embodiment.

As described above, even with the form in which the same wireless terminal performs channel reservation first and then transmits a frame to which information associated with a reception status is added, the same effects as those in the first embodiment can be obtained, although the information associated with the reception status is not instantaneously notified.

(Fifth Embodiment)

Since the fifth embodiment is basically the same as the fourth embodiment, an additional feature of the fifth embodiment with respect to the fourth embodiment will be mainly described below. The additional feature of the fifth embodiment with respect to the fourth embodiment is that when the wireless terminal is to add information associated with a reception status to a frame and transmit it, the terminal generates it on the basis of a frame previously received from the transmission destination wireless terminal for the frame.

Figure 9:
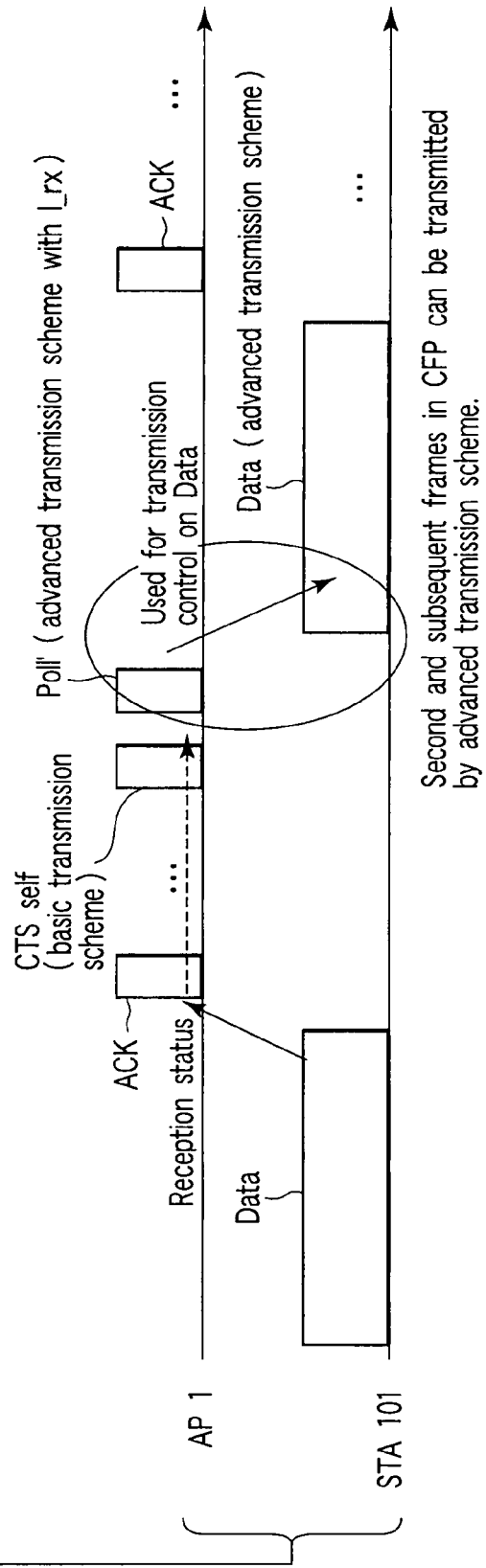
FIG. 9 is a view for explaining frame exchange according to the fifth embodiment of the present invention.

A wireless communication system according to this embodiment has an arrangement like that shown in FIG. 1. The wireless base station 1 according to the fourth embodiment must have acquired and held information associated with a reception status at the time of reception of a frame from the wireless terminal 101 in the past in order to transmit the information associated with the reception status from the wireless terminal 101 to the wireless terminal 101. Referring to FIG. 9, a wireless base station 1 holds information obtained upon receiving a frame from a wireless terminal 101 in the immediately preceding frame exchange, and then transmits a frame for channel reservation, i.e., a CTS self frame in this case. Thereafter, the wireless base station 1 transmits the information upon adding it to a CF-Poll frame ("Poll" in FIG. 9) to give a transmission right to the wireless terminal 101.

When the information associated with the reception status is added to the Poll frame, the frame is handled as a new frame, and "Subtype" described above may be defined independently. For this reason, this frame is written as "Poll'" in FIG. 9.

Referring to FIG. 9, in frame exchange before frame exchange for the transmission of the information associated with the reception status, an Ack is transmitted in response to a data frame. However, it is essential that the wireless base station 1 receives a data frame and acquires information associated with the reception status, but is not essential that the wireless base station 1 transmits an Ack. When, for example, the wireless terminal 101 transmits a broadcast frame or a multicast frame addressed to a plurality of wireless terminals, a wireless terminal which has received the frame transmits no Ack according to the IEEE 802.11 standard. According to the IEEE 802.11e standard and the like, in particular, the manner of responding to even a unicast frame for which a single destination is designated as a receiving station is designated by the MAC header portion of a data frame. Depending on the designation, no Ack frame is returned or acknowledgement information is returned altogether afterward. In this case, a period during which a given wireless terminal transmits a data frame, and one or a plurality of wireless terminals as transmission destinations of the data frame receive the data frame, even if any response frame such as an Ack frame is not transmitted will be referred to as frame exchange.

In addition, either the basic transmission scheme or the advanced transmission scheme may be used in a past frame exchange for the acquisition of information associated with a reception status.

FIG. 8 shows only one exchange of an Ack to a data frame as past frame exchange for the acquisition of information associated with a reception status. However, the present invention is not limited to this. For example, in an IEEE 802.11 wireless LAN system designed to perform CSMA/CA (Carrier Sense Multiple Access with Carrier Avoidance), frame exchanges are consecutively performed without carrier detection in some cases. That is, frame exchange may be performed a plurality of number of times like data-Ack-data-Ack- . . . In this case, "-" between data and an Ack represents an SIFS (short interframe space) period in IEEE 802.11. A wireless terminal which has received data transmits an Ack after a lapse of an SIFS since the reception of the data without performing carrier sense. A wireless terminal on the data transmitting side which has received the Ack transmits the next data after a lapse of an SIFS. According to the IEEE 802.11 standard, data in consecutive frame exchanges basically corresponds to data obtained by dividing a frame (a data frame or management frame in the narrow sense) transferred from an LLC or MAC management frame generating device into a plurality of fragments (which are independently transmitted in air through a PHY layer). According to the IEEE 802.11e standard and the like, such data is not limited to a fragment, in particular, and may be independently replaced with a data frame (in the broad sense). Alternatively, the present invention may take a form of frame exchange in which a plurality of individual data frames (in the broad sense) are combined (which may be combined at the PHY layer level instead of the MAC layer level), and consecutively transmitted as one data frame a plurality of number of times.

When the wireless terminal 101 is to perform a plurality of such consecutive frame exchanges with respect to the wireless base station 1, the wireless base station 1 may acquire information associated with a reception status from the state wherein the last data frame transmitted from the wireless terminal 101 was received. Whether a given frame is the last data frame in consecutive frame exchanges can be determined from information in one or a plurality of fields in the frame. For example, in an IEEE 802.11 wireless LAN system, a "MoreFrag" bit is prepared in the frame control field of a MAC header. When "1" is written in this bit, it indicates that frame exchanges follows. If "0" is written in the bit, it can be determined that the frame is the last data frame. According to the IEEE 802.11e standard and the like, a receiving side can make such determination by using the mechanism of making a wireless terminal on the data frame transmitting side notify the end of frame exchange by using the value of a duration/ID field. In addition, making a wireless terminal on the data frame transmitting side transmit a special frame for notifying the end of frame exchange allows a receiving wireless terminal to recognize the end of consecutive frame exchanges and acquire information based on the reception status of the special frame as information associated with a reception status from the transmitting wireless terminal. Alternatively, a last frame can be determined on the basis of a limitation imposed on a period during which frame exchange is consecutively performed. For example, according to the IEEE 802.11e standard and the like, since the maximum period of time during which consecutive transmission can be done is determined, when the time has elapsed, it can be determined that the frame received before the lapse of the time is the last frame in the consecutive frame exchanges.

According to the above description, it suffices to acquire information associated with a reception status from a state wherein the last data frame transmitted from the wireless terminal is received. However, such a frame is not necessarily limited to the last frame received at the end of frame exchange. For example, information obtained by statistically processing (e.g., averaging) the reception statuses of a plurality of reception frames in frame exchange immediately preceding the last frame exchange may be used. This makes it possible to notify statistical information as information associated with a past reception status. That is, this makes it possible to notify information at the level of time variations in a longer interval between wireless terminals instead of local information on the time axis. When information associated with a reception status is to be notified at predetermined intervals instead of within the same consecutive frame exchange, such information can become effective information between wireless terminals to which the information is notified.

Figure 10:
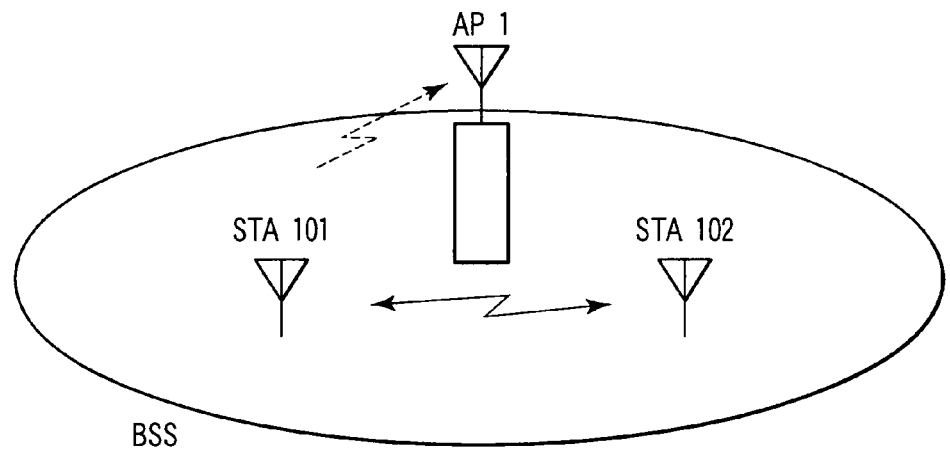
FIG. 10 is a view showing an example of the arrangement of another wireless communication system according to the fifth embodiment.

In addition, the present invention need not be limited to the acquisition of information associated with a reception status from a frame addressed to a self-terminal, and a frame on which information is based need not be limited to a data frame. Consider, for example, a case wherein a plurality of (two in this case) wireless terminals are accommodated in a BSS, as shown in FIG. 10. For example, according to the IEEE 802.11e standard, a wireless terminal is allowed not only to transmit data to another wireless terminal in the same BSS through a wireless base station but also to directly communicate with another wireless terminal. The wireless base station 1 may observe (receive) that the wireless terminal 101 performs frame exchange with a wireless terminal 102, hold information associated with the reception status of a frame from the wireless terminal 101 in the wireless base station 1, and notify the wireless terminal 101 of the information afterward. A frame from the wireless terminal 101 which is under observation may be a data frame (in the broad sense) or a control frame such as an Ack frame to a data frame transmitted from the wireless terminal 102.

As described above, information associated with a reception status can be acquired from past frame exchange. Specifically, information based on statistics can be acquired, which is effective for a wireless terminal to which information associated with a reception status is notified. This information can be used by the wireless terminal according to the forth embodiment.

(Sixth Embodiment)

The sixth embodiment is based on the first to fifth embodiments, and a different point between the sixth embodiment and the first to fifth embodiments will be mainly described below. The sixth embodiment differs from these embodiments in a reception scheme with respect to the basic transmission scheme and advanced transmission scheme.

In the first embodiment, the basic transmission scheme is defined as a scheme which always needs to cope with transmission and reception in a BSS. In the sixth embodiment, however, the basic transmission scheme is defined as a scheme capable of reception and decoding in the basic reception scheme and advanced reception scheme. In contrast to this, the advanced transmission scheme is defined as a scheme which can perform reception and decoding in the advanced reception scheme but cannot decode PHY data successfully (although it can decode PHY preamble) in the basic reception scheme. Even under such limitations, according to the first to fifth embodiments, even if a wireless terminal which can cope with only the basic reception scheme is present, the wireless terminal can be made to perform channel reservation.

Figure 11A:
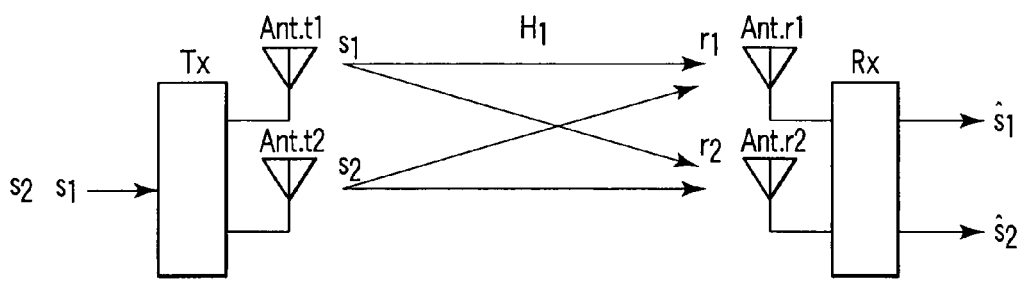
FIGS. 11A and 11B are views for explaining a system designed to perform transmission by using a plurality of antennas and a system designed to perform transmission by using a single antenna, respectively.

For example, the advanced transmission scheme can be defined as a transmission scheme which transmits signals from a plurality of transmission antennas. FIG. 11A shows an example of this scheme. In this case, two transmission antennas Ant.t1 and Ant.t2 are used on the transmitting side (Tx), but the number of antennas is not limited to two and may be n (n: an integer of two or more). Assume that signals $s_1$ and $s_2$ are transmitted from the transmission antennas Ant.t1 and Ant.t2, respectively. Let $H_1$ be a transmission channel response. For example, on the receiving side (Rx), a wireless terminal for which two reception antennas Ant.r1 and Ant.r2 can estimate the transmission signals $s_1$ and $s_2$ (estimated signals are represented by $\hat{s}_1$ and $\hat{s}_2$) by multiplying signals $r_1$ and $r_2$ received from the respective antennas by the inverse matrix of the estimated transmission channel response $H_1$. In this manner, the transmission rate can be increased to a multiple of the number of transmission antennas (in the example shown in FIG. 11A, the transmission rate is doubled). A communication system using a plurality of transmission antennas and a plurality of reception antennas is called a MIMO (Multiple-Input Multiple-Output) system.

Figure 11B:
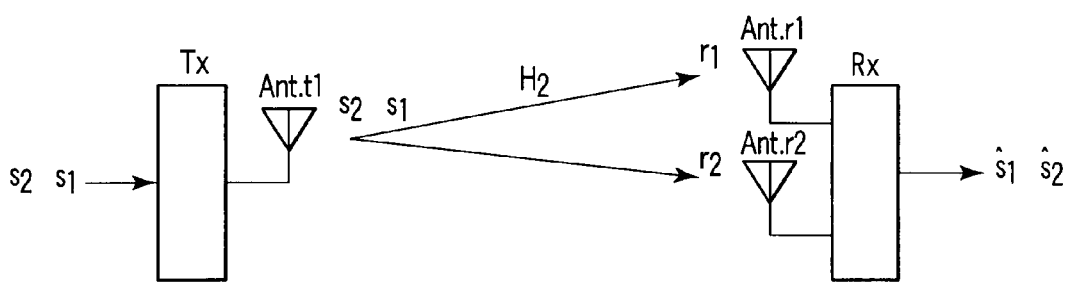

For example, in the example shown in FIG. 11B, transmission is performed by using the basic transmission scheme. The transmission scheme used in a transmission apparatus comprising one transmission antenna Ant.t1 is the basic transmission scheme. In contrast to this, the receiving side can receive a signal through one reception antenna, or can perform reception through a plurality of reception antennas (the two antennas Ant.r1 and Ant.r2 in the example shown in FIG. 11B) as in the example shown in FIG. 11B. The basic reception scheme is a reception scheme comprising one reception antenna which cannot decode PHY data signals transmitted from a plurality of transmission antennas, although it can decode PHY preamble signals. The advanced reception scheme is a reception scheme configured to receive and decode signals transmitted from a plurality of transmission antennas by using, for example, a method of estimating a transmission channel response $H_2$ and multiplying the reception signals by the inverse matrix of the transmission channel response as in the example shown in FIG. 11B in which signals are received through a plurality of reception antennas.

Consider a wireless communication system which includes both a wireless terminal compatible with the advanced reception scheme and a wireless terminal compatible with only the basic reception scheme, assuming that the basic transmission scheme is capable of reception/decoding in the basic reception scheme and advanced reception scheme, and the advanced transmission scheme is capable of reception/decoding in the advanced reception scheme but is not capable of decoding a PHY data in the basic reception scheme, although it is capable of decoding a PHY preamble.

Consider, for example, a BSS having an arrangement like that shown in FIG. 10. Assume that a wireless terminal 101 is a wireless terminal compatible with the advanced reception scheme, and a wireless terminal 102 is a wireless terminal compatible with only the basic reception scheme. FIG. 10 shows a case wherein the wireless terminal 101 is directly communicating with the wireless terminal 102. However, this is not essential here.

As described in the first to fifth embodiments, when a wireless base station 1 performs frame exchange with the wireless terminal 101, the wireless terminal 102 detects a virtual carrier with a frame transmitted from the wireless base station 1 by the basic transmission scheme, and transmits no data frame while the wireless base station 1 and the wireless terminal 101 perform frame exchange by the advanced transmission scheme. In an IEEE 802.11 wireless LAN system, the wireless terminal 102 receives a frame transmitted from the wireless base station 1 by the basic transmission scheme and sets NAV in accordance with the duration/ID field of the frame because the frame is not addressed to the self station. When the wireless base station 1 writes, in the duration/ID field of the frame, a period of time until the end of frame exchange with the wireless terminal 101, channel reservation is made with respect to the wireless terminal 102. The wireless terminal 102 cannot decode transmission frames based on the advanced transmission scheme, although it can decode PHY preambles of the transmission frames, but makes virtual carrier sense effective so as not to interfere with frame exchange between the wireless base station 1 and the wireless terminal 101.

FIGS. 12 to 15 correspond to FIGS. 5 to 8, respectively, which show the first to fifth embodiments. Referring to FIGS. 12 to 15, the wireless base station 1 and wireless terminal 101 are described as compatible with the basic and advanced transmission/reception schemes. However, in the sixth embodiment, it suffices if they are compatible with only the advanced reception scheme.

Figure 12:
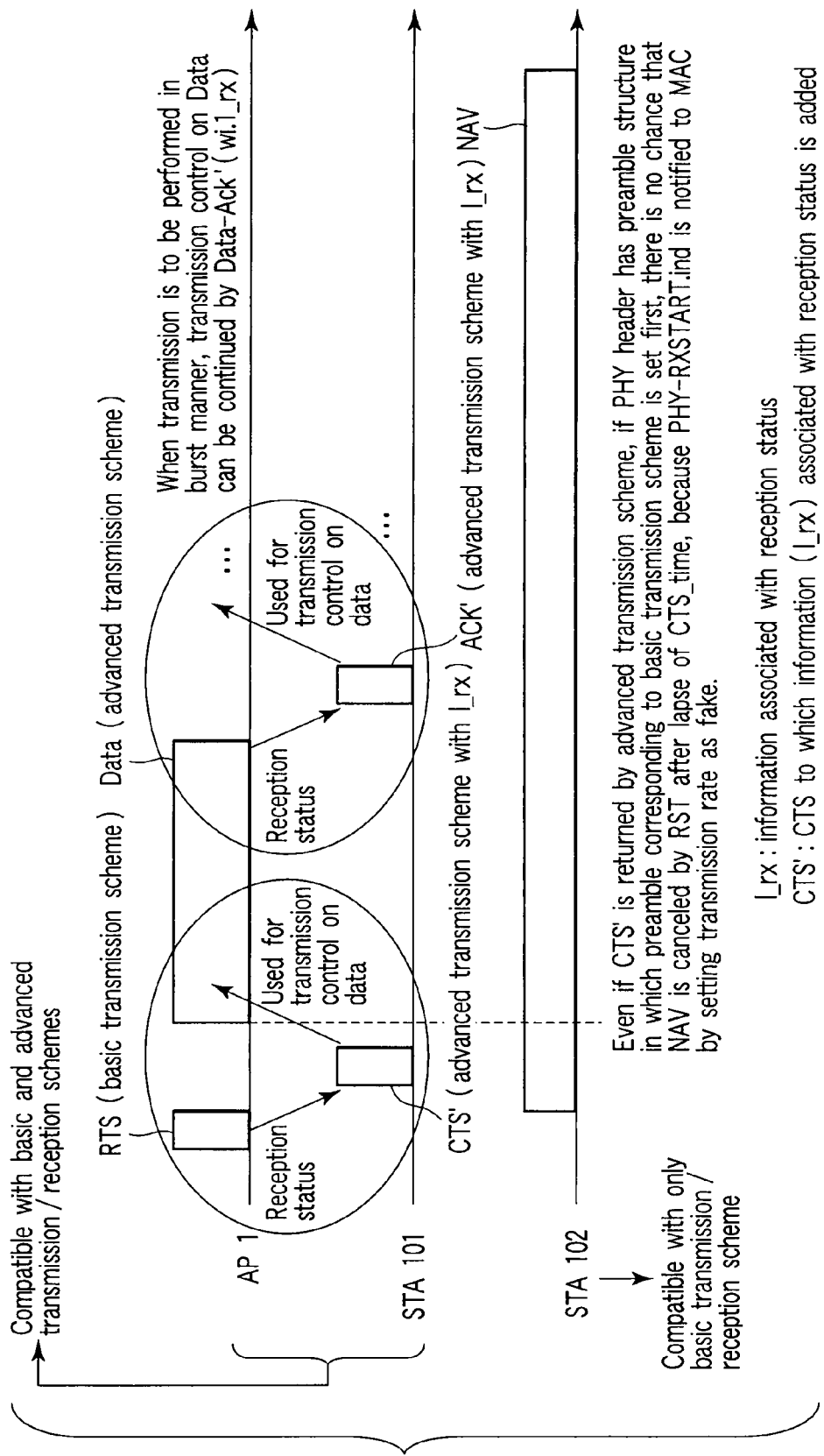
FIG. 12 is a view for explaining frame exchange according to the sixth embodiment of the present invention.

In the IEEE 802.11 wireless LAN system, as shown in FIG. 12, a wireless terminal which has received an RTS frame and set NAV is allowed to cancel the set NAV when a signal (PHY-RXSTART.indication) indicating that the reception of a frame which can be received/decoded at the PHY layer is started is not notified to the MAC layer during (2×SIFS)+(CTS_Time)+(2×Slot) from the end of the reception of the RTS frame (the time point at which PHY-RXEND.indication is notified from the PHY layer to the MAC layer). In this case, an SIFS (short interframe space) is the minimum time unit set between frames which is used to transmit a control frame as a response. CTS_Time is the estimated time occupied by a CTS frame in air, and is the time calculated from the rate at which an RTS frame is received and the length of a CTS frame.

A slot is a time unit defined in accordance with the PHY layer, is provided by the sum of the shortest time (CCATime) during which physical sense carrier can be performed by using a CCA (Carrier Channel Assessment) mechanism to detect whether the air is busy or idle, the longest required time (RxTxTurnaroundTime) in which the PHY layer switches from reception to transmission, a predicted necessary time (AirPropagationTime) in which a transmission signal from a transmitting terminal reaches a receiving terminal, and a nominal time (MACProcessingDelay) between the instant at which the MAC layer processes a frame and the instant at which the MAC layer transfers a response frame to the PHY layer.

Referring to FIG. 12, assume that a scheme designed to perform MIMO modulation is used as the advanced transmission scheme, and the wireless terminal 102 cannot cope with a scheme designed to perform MIMO demodulation as a reception scheme. In this case, when the wireless terminal 102 receives a CTS frame (in this case, a CTS' frame obtained by adding information associated with a reception status to the CTS frame) or a data frame using MIMO modulation, the wireless terminal 102 cannot generate PHY-RXEND.indication and notify it to the MAC layer depending on the preamble arrangement of the PHY header portion of the reception signal. As a consequence, the wireless terminal 102 may cancel NAV. If the transmission power is decreased by transmission power control during frame exchange between the wireless base station 1 and the wireless terminal 101 afterward, it may happen that the wireless terminal 102 cannot detect the frame exchange by physical carrier sense, and transmits a frame to interfere with communication between the wireless base station 1 and the wireless terminal 101. In order to avoid such a problem accompanying the cancellation of NAV by the wireless terminal 102, the preamble arrangement of the PHY header portion of a MIMO-modulated signal is preferably compatible with the preamble arrangement of the PHY header portion of a signal which is not MIMO-modulated.

According to the IEEE 802.11 MAC, there is a limitation imposed on the transmission rate of a response frame from a control system. In the same PHY option as that of an original frame to which a response is to be made (i.e., one of IEEE 802.11 PHY specifications, e.g., 802.11a OFDM or 802.11 DS-SS), the highest transmission rate among the transmission rates lower than that of the original frame in the BSS basic rate set is selected. The BSS basic rate set includes transmission rates which must support transmission/reception by the BSS without fail, and is notified with a beacon or probe response frame, as in the case of the operational rate set described above.

MIMO transmission schemes include the SDM (Space Division Multiplexing) (FIG. 25A) scheme of increasing the transmission rate to a multiple of the number of antennas by spatial multiplexing, and the STC (Space Time Coding)

scheme (FIG. 25B) of obtaining a transmission diversity effect without changing the transmission rate. Assume that the BSS basic rate set of OFDM with a transmission antenna count of 1 includes 6, 12, 24, and 36 Mbps. In this case, if the number of transmission antennas is defined from 1 to 3 in the SDM scheme, a BSS basic rate set can be determined from transmission rates obtained by multiplying 6, 12, 24, and 36 Mbps by two or three. In this case, for example, the transmission rates in MIMO-OFDM are 6×M, 12×M, 24×M, and 36×M Mbps (M=number of transmission antennas), and the BSS basic rate set of MIMO can be defined as 6×2, 6×3, 24×2, and 24×3 Mbps from the above transmission rates. In this case, although 6×2 Mbps is equal to 12 Mbps, this notation explicitly expresses that the number of transmission antennas is two, and a 6-Mbps stream is duplexed. In the case of the STC scheme, since, for example, the transmission rates are not increased even when transmission is performed by two transmission antennas, transmission rates of MIMO-OFDM are defined as 6(STC), 12(STC), 24(STC), and 36(STC) Mbps. MIMO-OFDM is presently accepted technology for future standard of wireless LAN at IEEE802.11 Task Group n.

In this embodiment premised on the use of MIMO as the advanced transmission scheme, the lowest transmission rate in the advanced transmission scheme is 6×2 Mbps in the SDM scheme, and 6 Mbps in the STC scheme.

The above limitation on the CTS transmission rate is replaced with the lowest transmission rate in a PHY option having backward compatibility with a frame to which a response is to be made in this embodiment. Assume that in a system using 802.11a OFDM and MIMO, an RTS frame is transmitted at 54 Mbps OFDM, and the BSS basic rate set includes 6, 12, 24, 36 Mbps OFDM and 6×2, 6×3, 24×2, and 24×3 Mbps MIMO-OFDM using the SDM scheme. In this case, although a CTS frame is supposed to transmit at 36 Mbps OFDM, 6×2 Mbps MIMO-OFDM is used in this case.

In order to reduce an error in calculating the duration/ID of a CTS frame on the basis of the duration/ID field of an RTS frame, the duration/ID field of the RTS frame may be set on the basis of calculation made in consideration of the fact that subsequent transmission will be performed by MIMO.

In this case, MIMO transmission, as in the case of transmission from a single antenna, a lower rate (lower-order modulation scheme with a lower coding rate as in BPSK (Binary Phase Shift Keying)) is superior in error tolerance. In CTS transmission, therefore, the lowest transmission rate per antenna in the BSS is selected in consideration of error tolerance. If the transmission rate per antenna remains the same, the use of the STC scheme ensures high error tolerance. Therefore, a transmission rate using STC is selected for CTS transmission.

In order to convert a CTS frame into a MIMO frame and grasp the transmission channel state, CTS transmission is preferably performed by using as many transmission antennas as possible to the extent that no information error occurs. Assume that a wireless terminal including three antennas has transmitted a CTS frame by using two antennas. In this case, even if transmission channels from the two antennas are poor, there is a possibility that a transmission channel from the remaining one antenna is good. In this case, as compared with using information from only two antennas, transmitting information by using three antennas makes it possible to perform determination with a higher degree of spatial multiplexing of data to be transmitted afterward in a wireless terminal on the CTS receiving side. Therefore, a CTS frame may be transmitted by using the maximum number of antennas which can be used in consideration of error tolerance in this manner.

Alternatively, it may suffice to use a transmission rate in consideration of the limitation imposed on the transmission rate for CTS frames in IEEE 802.11 described above instead of simply using the lowest transmission rate in the advanced transmission scheme. For example, the CTS frame is transmitted with a transmission rate Txa. Txa is the highest one among the transmission rates equal to or lower than Txb in the BSS basic rate set for MIMO-OFDM. Txb is the highest one among the transmission rates equal to or lower than that of RTS frame in the BSS basic rate set for OFDM.

Assume that the RTS frame is transmitted at 54 Mbps OFDM, and the BSS basic rate set includes 6, 12, 24, 36 Mbps OFDM and 6×2, 6×3, 24×2, and 24×3 Mbps MIMO-OFDM using the SDM scheme in MIMO-OFDM. In this case, since Txb is 36 Mbps, 6×3 Mbps included in the BSS basic rate set in MIMO-OFDM is Txa. That is, a CTS frame is transmitted at 6×3 MIMO-OFDM.

As shown in FIGS. 25A and 25B, transmission schemes used in MIMO transmission roughly include the SDM scheme and STC scheme. As described above, since a lower transmission rate per antenna is selected as a rate in CTS transmission, if, for example, 6×3 Mbps and 24×3 Mbps in the OFDM-MIMO BSS basic rate set are available, the former is selected. Assume that the transmission rate per antenna remains the same. In this case, if 6×2 Mbps in the OFDM-MIMO BSS basic rate set and 6(STC) Mbps in the OFDM-MIMO BSS basic rate set are available, the latter is selected, which exhibits higher error tolerance in CTS transmission. Consider 6×2 Mbps and 12(STC) Mbps. In this case, although the former is lower in transmission rate per antenna, it is not necessarily appropriate to suggest that a specific one of the transmission rates is higher in error tolerance (this is because the former is duplexed in BPSK, and the latter is STC in QPSK). In this case, although it depends on the operation policy, a transmission rate which clearly exhibits the highest error tolerance, e.g., 6(STC) Mbps, is generally set as an OFDM-MIMO BSS.

Assume that the BSS basic rate set includes 6, 12, 24, and 36 Mbps and uses the STC scheme in OFDM and MIMO-OFDM, with 6(STC), 12(STC), 24(STC), and 36(STC) for two antennas, and 6(STC), 12(STC), 24(STC), and 36(STC) Mbps MIMO-OFDM for three antennas. In this case, when an RTS frame is received at 54 Mbps OFDM, transmission is performed at 36 Mbps OFDM according to the limitation from the IEEE 802.11 MAC. In this case, however, 36(STC) Mbps MIMO-OFDM for three antennas can be used. This makes it possible to select the most robust transmission scheme while complying with the limitation from the existing 802.11 MAC.

As described above, even if only a wireless terminal compatible with only the basic reception scheme exists under the limitation that a signal transmitted by the advanced transmission scheme can be received and decoded by only the advanced reception scheme, stable communication can be ensured by making the wireless terminal reserve a channel.

In addition, even if it is not recognized that a wireless terminal compatible with only the basic reception scheme belongs to the same BSS or there is a wireless terminal in another BSS whose communication area (partly) overlaps that of the BSS, a preventive measure is taken against the wireless terminal, thereby ensuring stable communication.

When MIMO modulation is used as the advanced transmission scheme, in particular, the above effects can be obtained. In addition, in MIMO modulation, the reliability of frame exchange can be improved. Furthermore, the above effects can be obtained by adding determination for increasing the degree of spatial multiplexing of data on the data transmitting side.

(Seventh Embodiment)

The seventh embodiment is based on the first to sixth embodiments, and hence a different point between the seventh embodiment and these embodiments will be mainly described below. The seventh embodiment differs from the other embodiments, on which the seventh embodiment is based, in that for each BSS, ESS, or the like in a wireless communication system, e.g., an IEEE 802.11 wireless LAN system, when all wireless terminals (including a wireless base station) constituting this system are compatible with the advanced transmission/reception scheme, frames for making wireless terminals other than a destination wireless terminal, with which frame exchange is to be performed, perform channel reservation are transmitted by the advanced transmission scheme.

Although all the wireless terminals (including the wireless base station) constituting the system are compatible with the advanced reception scheme, a wireless terminal without the advanced transmission scheme may also exist in the system.

Figure 16:
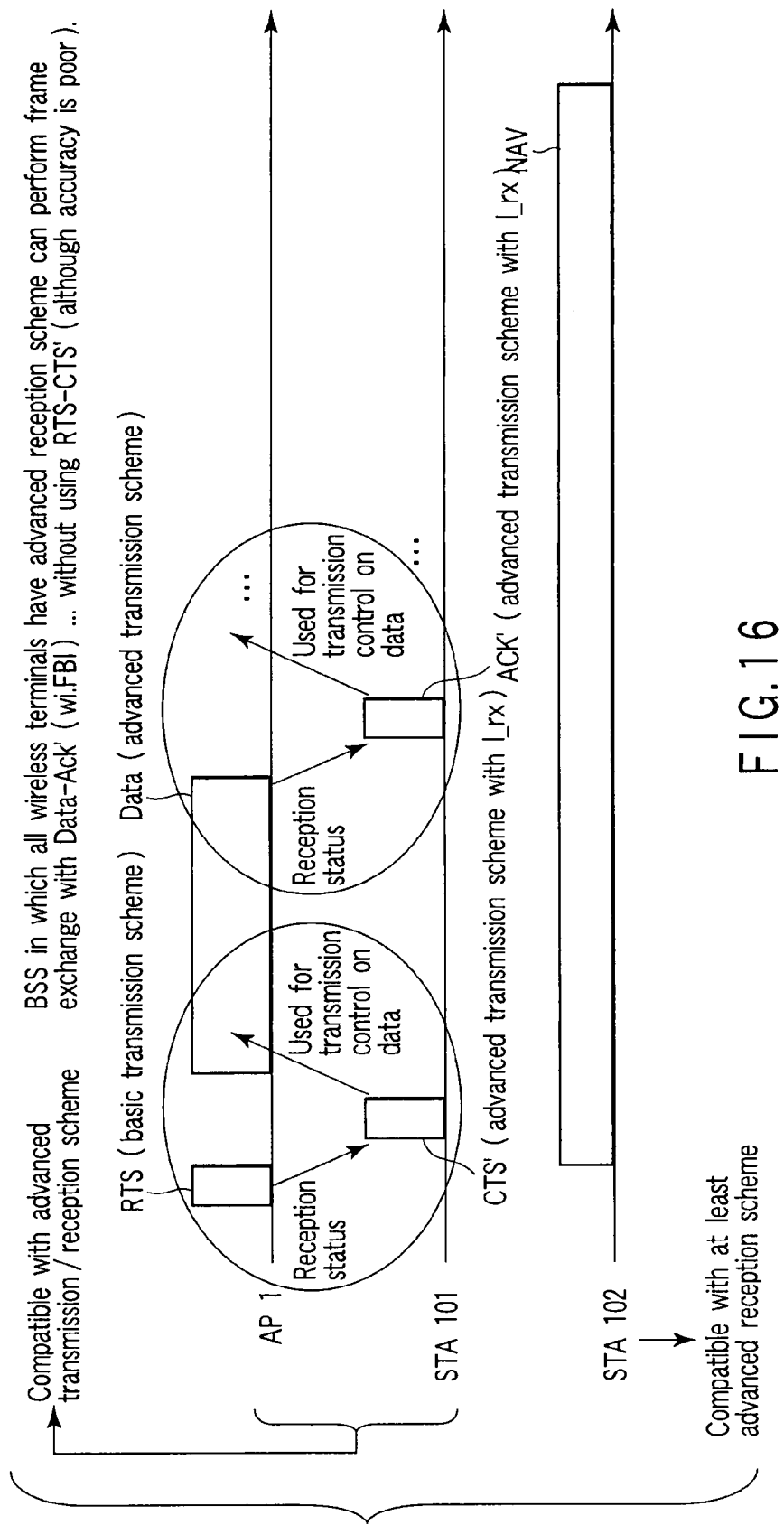
FIG. 16 is a view for explaining frame exchange according to the seventh embodiment of the present invention.

Consider, for example, a case wherein a wireless base station 1 and wireless terminals 101 and 102 in a wireless communication system having the same arrangement as that shown in FIG. 10 are compatible with the advanced transmission/reception scheme. As shown in FIG. 16, frame exchange like "RTS-CTS'- . . . " is performed between wireless terminals having the advanced transmission/reception scheme and between the wireless base station 1 and the wireless terminal 101 by the advanced transmission scheme. The wireless terminal 102 can receive and decode frames transmitted by the advanced transmission scheme, and hence receive and decode an RTS frame transmitted by the advanced transmission scheme and sets NAV as virtual carrier sense.

Even if the wireless base station 1 and wireless terminal 101 are compatible with the advanced transmission/reception scheme, and the wireless terminal 102 is compatible with only the advanced reception scheme, the wireless terminal 102 performs the same operation as frame exchange between the wireless base station 1 and the wireless terminal 101, thereby obtaining the same effects as those described above.

As described in the first embodiment, frame exchange of RTS and CTS' frames may be omitted, so that a data frame is transmitted by the advanced transmission scheme at the start of frame exchange, and information associated with a reception status (Ack' frame) is added to an Ack frame to be returned by the advanced transmission scheme. Alternatively, frame exchange like RTS-CTS'-Data-Ack' . . . is performed to frequently notify the data frame transmitting side of frames associated with reception statuses.

The advanced transmission scheme in this embodiment is, for example, the transmission scheme described in the sixth embodiment, in which signals are transmitted from a plurality of transmission antennas. The advanced reception scheme is the reception scheme capable of receiving/decoding signals transmitted from a plurality of transmission antennas. As such a communication scheme of transmitting signals from a plurality of antennas, MIMO is available. In this case, the advanced transmission scheme is MIMO modulation, and the advanced reception scheme is MIMO demodulation.

In this case, as the transmission rate of the first frame to be transmitted by the advanced transmission scheme in frame exchange performed by burst transmission, the lowest transmission rate is selected or the most robust transmission method is selected to improve the reliability in continuing burst transmission afterward.

As described above, when no signals need to be transmitted by the basic transmission scheme, the communication efficiency can be improved and the reliability in continuing burst transmission can be improved by starting frame exchange by the advanced transmission scheme.

(Eighth Embodiment)

The eighth embodiment is based on the sixth embodiment, and hence a different point between them will be mainly described below. The different point between the eighth embodiment and the sixth embodiment is that in the sixth embodiment, a wireless terminal which is an actual transmission destination to which a frame has been transmitted to make the terminal reserve a channel notifies the transmission source wireless terminal of information associated with a reception status, whereas in the eighth embodiment, a wireless terminal to which information associated with a reception status is to be notified is not limited to this wireless terminal.

Assume that a wireless communication system in this embodiment has an arrangement like that shown in FIG. 10. Assume that a wireless base station 1 and wireless terminal 101 are compatible with the basic and advanced transmission/reception schemes, and a wireless terminal 102 is compatible with only the basic transmission/reception scheme. Alternatively, the wireless base station 1 and wireless terminal 101 may be compatible with the basic and advanced transmissions and advanced reception scheme, and the wireless terminal 102 may be compatible with only the basic transmission/reception scheme. In this case, the advanced reception scheme is capable of receiving and decoding signals transmitted by the basic transmission scheme.

Figure 17:
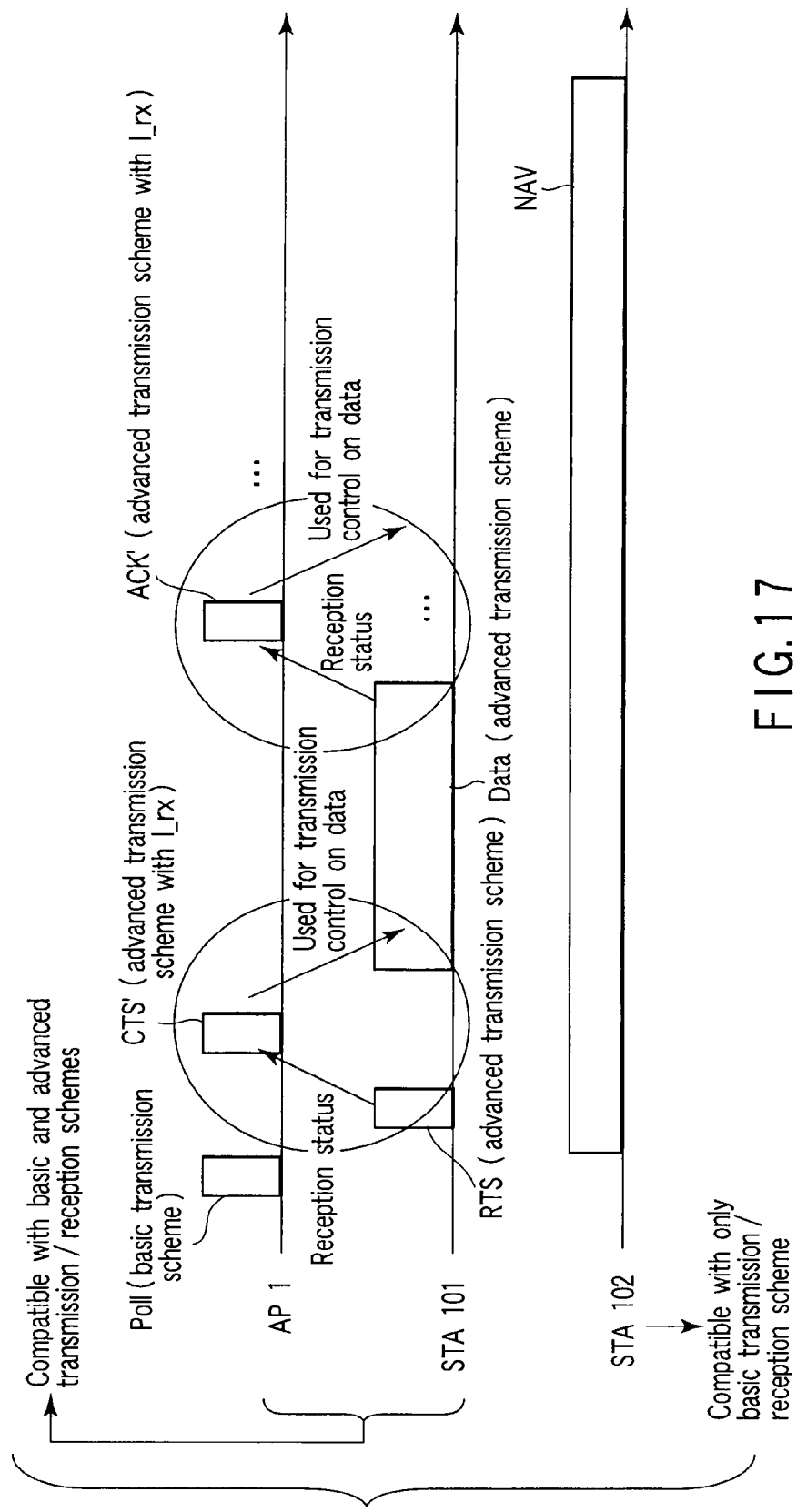
FIG. 17 is a view for explaining frame exchange according to the eighth embodiment of the present invention.

For example, as shown in FIG. 17, the wireless base station 1 transmits a frame for giving a transmission right (a CF-Poll in the IEEE 802.11 standard or a QoS CF-Poll frame in the IEEE 802.11e standard) to the wireless terminal 101 by the basic transmission scheme, and the wireless terminal 102 which has received the frame sets NAV for the period designated by the Poll frame. Upon acquiring a transmission right through the Poll frame, the wireless terminal 101 transmits an RTS frame to the wireless base station 1 by the advanced transmission scheme. The wireless base station 1 transmits a CTS frame (CTS' frame), to which information (I_rx) associated with a reception status is added, as a response to the RTS frame by the advanced transmission scheme. By obtaining the information associated with the reception status from the wireless base station 1, the wireless terminal 101 can control a transmission method in the next data frame transmission. The wireless base station 1 may transmit an Ack frame as an applied frame with respect to the data frame from the wireless terminal 101 upon adding the information associated with the reception status (Ack' frame). Alternatively, the wireless base station 1 and wireless terminal 101 may perform only frame exchange of data-Ack'- while omitting frame exchange of RTS-CTS'- after the reception of the Poll frame.

Referring to FIG. 17, the wireless terminal 101 transmits an RTS frame to the wireless base station 1. However, the wireless terminal 101 may transmits an RTS frame to another wireless terminal (e.g., a wireless terminal 104) compatible with the advanced transmission/reception scheme. Upon receiving the RTS frame transmitted from the wireless terminal 101 by the advanced transmission scheme, the wireless terminal 104 performs the same operation as the wireless base station 1 described above, i.e., transmitting a CTS' frame, to which information associated with a reception status is added, as a response to the RTS frame by the advanced transmission scheme, and the like, except that the wireless base station transmits a Poll frame by itself.

Figure 18:
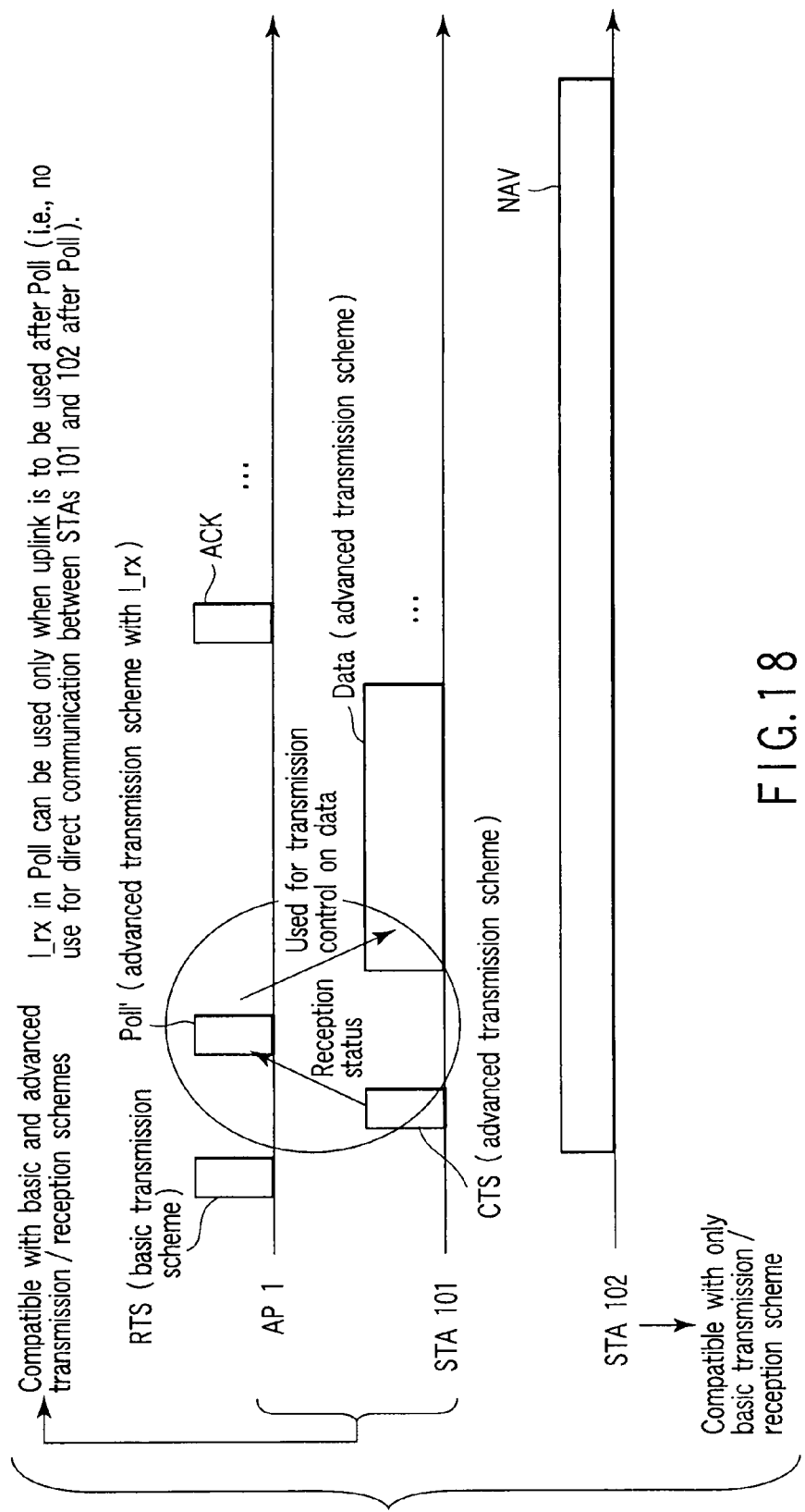
FIG. 18 is a view for explaining another frame exchange according to the eighth embodiment.

In addition, as shown in FIG. 18, an RTS frame for channel reservation is transmitted first, and then information associated with a reception status may be notified at the time of transmission of a Poll frame after a CTS response is returned. In this case, the information associated with the reception status of the CTS frame is transmitted through the Poll frame, and hence there is a limitation that the information can be used only when the wireless terminal 101 to which the Poll frame has been transmitted performs transmission to the wireless base station 1, i.e., uplink transmission is performed.

In addition, an IEEE 802.11 wireless LAN system or the like has a mechanism of setting in advance a period (CFP: Contention Free Period) during which channel reservation is performed. For example, a field called "CF Parameter Set element" can be set in a beacon frame or probe response frame, which can notify what cycle and how long a CFP can be set. With this notification, the wireless terminal grasps the start point of a CFP in advance and sets NAV. This operation is performed when a function called a PCF (Point Coordination Function) in an IEEE 802.11 wireless LAN system is used. For example, according to the IEEE 802.11e standard, a CFP can be set by using a frame other than a beacon frame or probe response frame. In a CFP, a wireless terminal can transmit a data frame (in the broad sense) only when receiving a Poll frame from a wireless base station. By using this mechanism, even if a wireless terminal compatible with only the basic reception scheme is present, a wireless terminal having a transmission right can start frame exchange by the advanced transmission scheme as in the seventh embodiment, without transmitting a frame for channel reservation at the start of frame exchange, upon making the wireless terminal perform channel reservation.

In this case, selecting the lowest transmission rate as the transmission rate of the first frame transmitted by the advanced transmission scheme in frame exchange performed by burst transmission or selecting the most robust transmission method makes it possible to improve the reliability in continuing burst transmission afterward.

As described above, even a wireless terminal other than a wireless terminal to which a channel reservation frame is transmitted can notify another wireless terminal of information associated with a reception status, and can start communication upon improving the reliability in continuing subsequent burst transmission.

(Ninth Embodiment)

The ninth embodiment is basically the same as the seventh embodiment, and hence a different point between them will be mainly described below. The ninth embodiment differs from the seventh embodiment in that only a frame to which information associated with a reception status is added is transmitted, unlike the seventh embodiment in which a frame for channel reservation and a frame to which information associated with a reception status is added are separately present.

Consider a case wherein for each BSS, ESS, or the like in a wireless communication system, e.g., an IEEE 802.11 wireless LAN system, all wireless terminals (including a wireless base station) constituting this system are compatible with the advanced transmission/reception scheme, or a case wherein all the wireless terminals (including the wireless base station) constituting the system are compatible with the advanced reception scheme, but some of them are not compatible with the advanced transmission scheme as in the seventh embodiment.

Consider, for example, a case wherein in a wireless communication system having an arrangement like that shown in FIG. 10, a wireless base station 1 and wireless terminal 101 are compatible with the advanced transmission/reception scheme, and at least a wireless terminal 102 is compatible with the advanced reception scheme. As shown in FIG. 19, the wireless base station 1 transmits a Poll frame (Poll' frame), to which information associated with the reception status of a frame received from the wireless terminal 101 in the past is added, to the wireless terminal 101 by the advanced transmission scheme. Since the wireless terminal 102 can receive and decode the Poll' frame from the wireless base station, and hence sets NAV. With this operation, the wireless terminal 102 is prevented from interfering with subsequent frame exchange between the wireless base station 1 and the wireless terminal 101.

In this case, there is a limitation that the wireless terminal 101 can use the information only when the wireless terminal 101 to which the Poll frame has been transmitted performs transmission to the wireless base station 1, i.e., uplink transmission is performed.

In this case, the Poll frame (Poll' frame) to which the information associated with the reception status is added is transmitted upon selecting the lowest transmission rate of the transmission rates in the advanced transmission scheme or the most robust transmission method of the advanced transmission methods.

See the acquisition/holding method described in the fifth embodiment for the acquisition/holding method for the information associated with the reception status of the past frame from the wireless terminal 101, which is transmitted through the Poll, frame. Referring to FIG. 9, the CTS self frame transmitted by the basic transmission scheme can be omitted.

Figure 20:
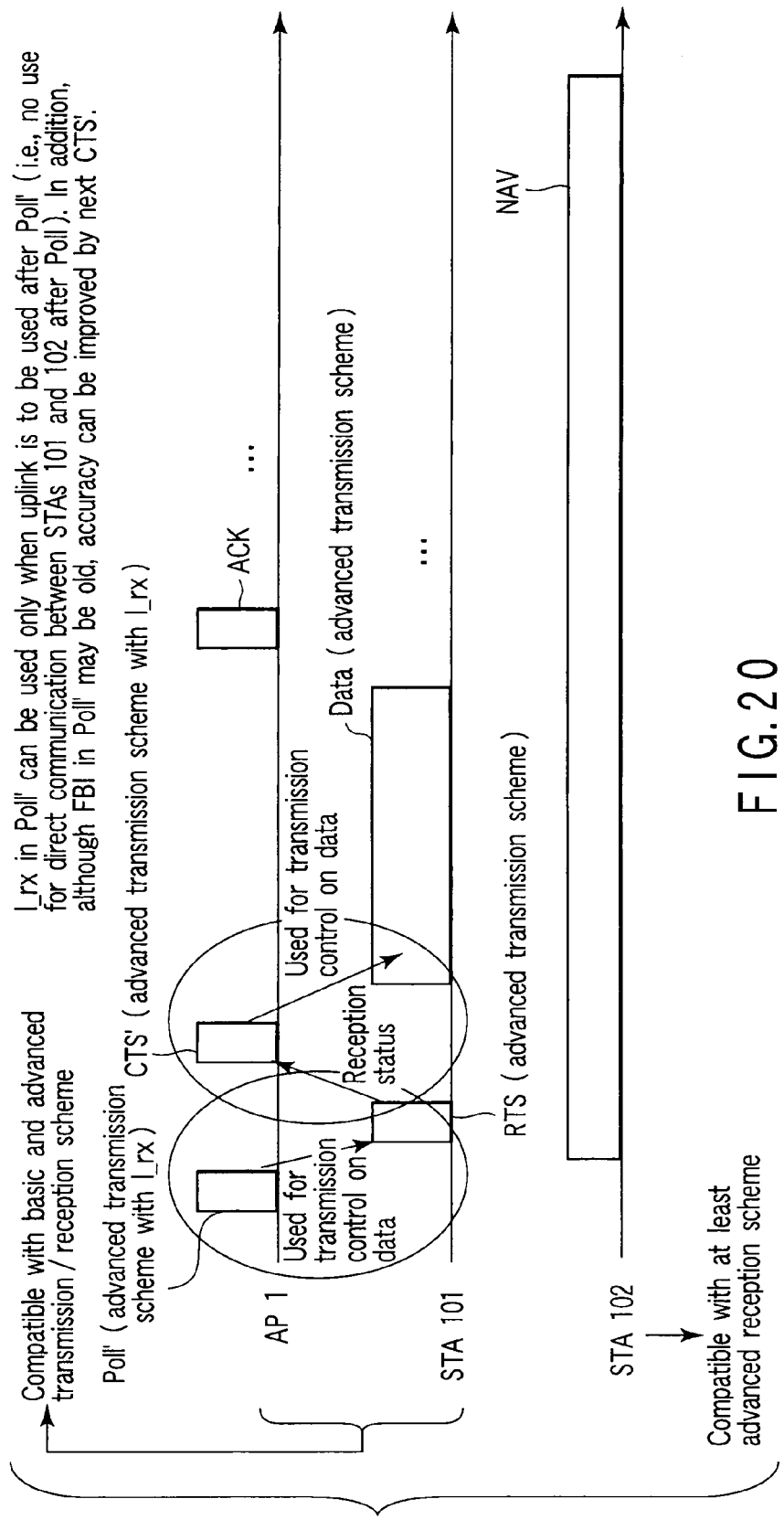
FIG. 20 is a view for explaining another frame exchange according to the ninth embodiment.

Instead of the operation in FIG. 19, the wireless terminal 101 may transmit an RTS frame to the wireless base station 1 upon reception of the Poll' frame, and the wireless base station 1 may notify, through a CTS frame, the wireless terminal 101 of the information associated with the reception status upon reception of the RTS from the wireless base station 1, as shown in FIG. 20. This makes it possible for the wireless terminal 101 to serve as an entity and increase the accuracy of the information associated with the reception status.

As shown in FIG. 21, after the wireless base station 1 notifies the wireless terminal 101 of an RTS frame to which information associated with a reception status is added, the wireless base station 1 may receive CTS frame from the wireless terminal 101 to improve the accuracy of the information associated with the reception status, and may notify the wireless terminal 101 of the information through a Poll' frame again. In the case shown in FIG. 21, the wireless base station 1 serves as an entity to improve the accuracy of the information associated with the reception status.

Adding the information associated with the reception status to the RTS frame makes the RTS frame be handled as a new frame. That is, "Subtype" described above may be defined independently. Referring to FIG. 21, therefore, this frame is written as "RTS"".

In this case, the RTS frame (RTS" frame) to which the information associated with the reception status is added is transmitted upon selecting the lowest transmission rate of the transmission rates in the advanced transmission scheme or the most robust transmission method of the transmission methods in the advanced transmission scheme.

Alternatively, a downlink data frame may be transmitted from the wireless base station 1 to the wireless terminal 101 after information associated with a reception status is added to the frame (data' frame). The wireless terminal 101 can use this information for transmission control when returning an Ack frame as a response, or transmitting a data frame upon reception of a Poll frame from the wireless base station 1, or voluntarily transmitting a data frame. In contrast, the wireless terminal 101 may transmit a data' frame to another wireless terminal (including a wireless base station) to allow the receiving wireless terminal to use the information for transmission control.

In this case, in transmitting the data frame (data' frame) to which the information associated with the reception status is added, the wireless terminal 101 selects the lowest transmission rate of the transmission rates in the advanced transmission scheme or the most robust transmission method of the advanced transmission methods.

As also described in the seventh embodiment, the advanced transmission scheme in the ninth embodiment is a transmission scheme of transmitting signals from a plurality of transmission antennas as described in, for example, the sixth embodiment. The advanced reception scheme is a reception scheme capable of receiving and decoding signals transmitted from a plurality of transmission antennas. As such a communication scheme of transmitting signals from a plurality of antennas, MIMO is available. In this case, the advanced transmission scheme is MIMO modulation, and the advanced reception scheme is MIMO demodulation.

As described above, if there is no need to transmit signals by the basic transmission scheme as in a case wherein all neighboring wireless terminals are compatible with the advanced reception scheme, the communication efficiency and the reliability in continuing burst transmission can be improved by transmitting a frame to which information associated with a reception status is added as a start frame for frame exchange by the advanced transmission scheme.

(10th Embodiment)

The 10th embodiment is basically the same as the eighth embodiment, and hence a different point between them will be mainly described below. The 10th embodiment differs from the eighth embodiment in the following point. In the eighth embodiment, after another wireless terminal is made to perform channel reservation in advance, information associated with a reception status is added to a response frame. In contrast, in the 10th embodiment, information associated with a reception status is added to a frame for starting frame exchange as in the ninth embodiment.

Figure 22:
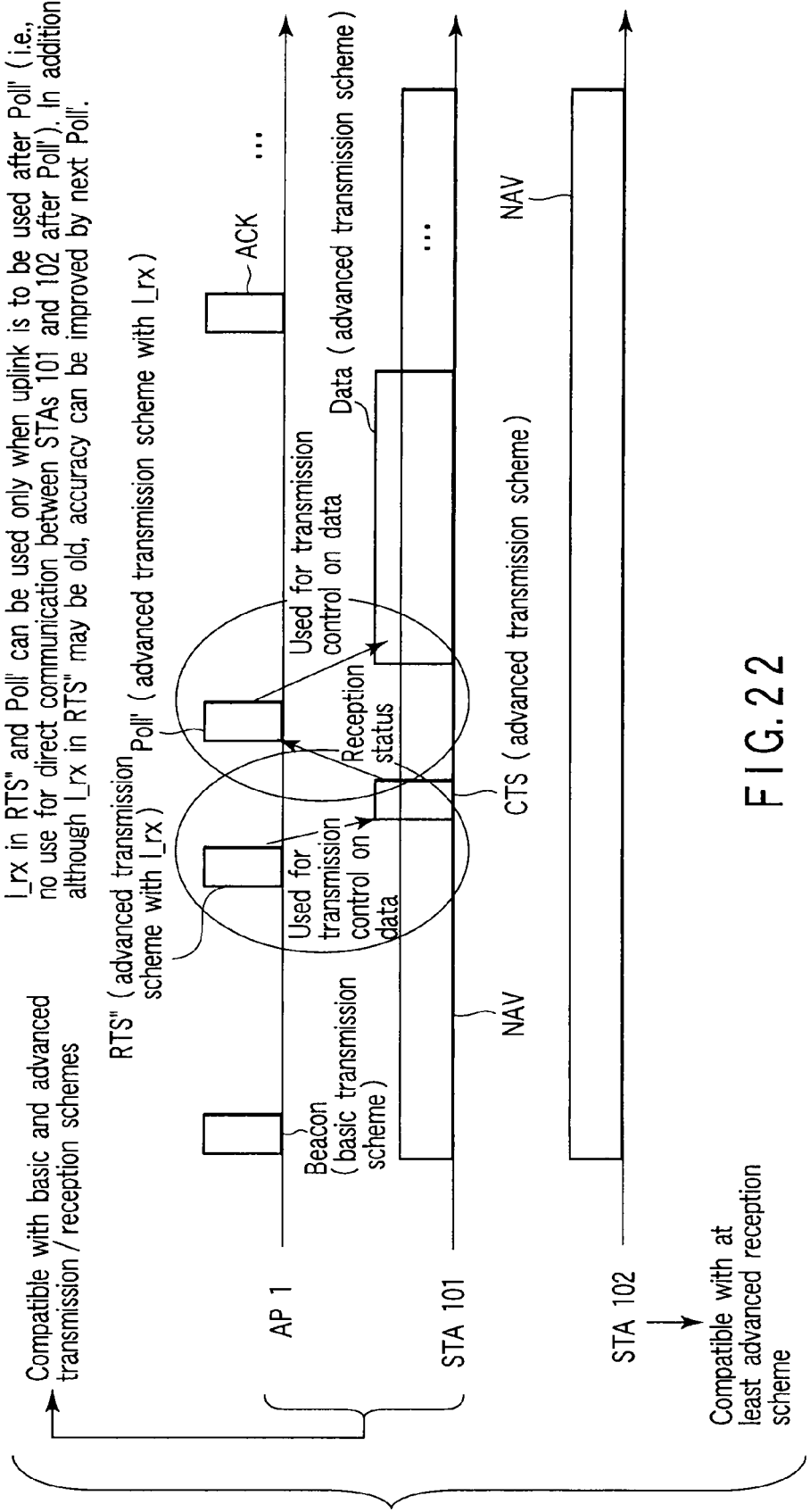
FIG. 22 is a view for explaining frame exchange according to the 10th embodiment of the present invention.

A wireless communication system in this embodiment has an arrangement like that shown in FIG. 10. For example, as shown in FIG. 22, under the presence of a wireless terminal 102 which is compatible with only the basic reception scheme, the wireless terminal 102 is made to set NAV in advance by using the CF parameter set element of a beacon frame. Likewise, a wireless terminal 101 sets NAV for a CFP. Referring to FIG. 22, the start time point of a beacon frame coincides with the time point at which a CFP is recognized and NAV is set. However, the start time point of a beacon frame may be delayed depending on whether, for example, the air is busy. A wireless terminal grasps the next CFP start time point from the preceding beacon frame. In this manner, after a wireless terminal is made to perform channel reservation in advance, frame exchange can be started by transmitting an RTS frame (RTS" frame) to which information associated with a reception status is added by the advanced transmission scheme. Even the wireless terminal 101 which has set NAV can permit a CTS response even under NAV by recognizing that the transmission source terminal of the RTS frame addressed to the wireless terminal 101 is a wireless base station. According to the IEEE 802.11e standard and the like, even under NAV, a CTS response is to be made to an RTS frame from a wireless terminal which has acquired a transmission right.

In this case, the RTS frame (RTS" frame) to which the information associated with the reception status is added is transmitted upon selection of the lowest transmission rate of the transmission rates in the advanced transmission scheme or the most robust transmission method of the advanced transmission methods.

As described above, if there is no need to perform transmission by the basic transmission scheme within a period during which a channel is reserved, the communication efficiency and the reliability in continuing burst transmission can be improved by transmitting a frame to which information associated with a reception status is added as a start frame for frame exchange by the advanced transmission scheme.

(11th Embodiment)

The 11th embodiment is basically the same as the first to 10th embodiments, and hence an additional feature with respect to these embodiments will be mainly described below. The additional feature of the 11th embodiment with respect to the first to 10th embodiments is that information associated with a reception status is, for example, the reception electric field strength of a reception frame.

When a given wireless terminal is notified of a reception electric field strength from another wireless terminal, the given wireless terminal estimates an transmission channel characteristic between itself and the another wireless terminal, and can reflect it in transmission control when transmitting a frame to the another wireless terminal. Assume that a wireless communication system in this embodiment has an arrangement like that shown in FIG. 10. When frame exchange is to be performed as shown in FIG. 12, a wireless terminal 101 holds, for example, a reception electric field strength as information associated with a reception status upon reception of an RTS frame from a wireless base station 1, together with the identifier of the transmission source wireless terminal, e.g., a MAC address or AID (Association ID) in an IEEE 802.11 wireless LAN system, in the form of a table. When such information is to be held, Table 1 may be used:

TABLE 1

| MAC address (hexadecimal notation) | reception electric field strength [dBm] |
|---|---|
| 0 × 55 0 × 44 0 × 33 0 × 22 0 × 11 0 × 00 | −48 |
| 0 × 11 0 × 22 0 × 33 0 × 44 0 × 55 0 × 66 | −52 |

When a given wireless terminal is to transmit a frame to another wireless terminal, the given wireless terminal refers to this table to write information corresponding to the transmission destination wireless terminal, i.e., a reception electric field strength, as information associated with the reception status of the transmission frame, in an allocated field, and transmits the frame.

A reception electric field strength may be notified as the power value of the actual reception electric field strength or a level value determined by some kind of rule. Alternatively, as in the case described in the fifth embodiment, a wireless terminal may use a value obtained by, for example, observing a plurality of reception frames and calculating an average value of the frames in order to obtain a statistical reception electric field strength between itself and a desired wireless terminal.

A reception electric field strength threshold may be determined such that when the reception electric field strength of a reception frame is equal to or more than a given value, it can be determined that the transmission channel characteristic is good, and information indicating whether or not a given reception electric field strength exceeds the threshold may be held. For example, whether such a reception electric field strength exceeds the threshold may be represented by 1 or 0 instead of the reception electric field strength item in Table 1. When a frame is to be transmitted, such information may be written as information associated with a reception status in an allocated field.

Instead of a reception electric field strength, an SNR (Signal to Noise Ratio), SIR (Signal to Interference Ratio), SINR (Signal to Interference plus Noise Ratio), reception EVM (Error Vector Magnitude), or the like may be used as information associated with a reception status. Alternatively, this information may be a transmission channel characteristic derived from one of the above values or estimated from a combination of a plurality of elements. Alternatively, this information may be a margin up to the limit level of receiver performance which is derived from one of the above values or calculated from a combination of a plurality of elements.

As another piece of information associated with a reception status, a spatial correlation calculated from the transmission channel value between the respective antennas may be used. When a received signal is the one transmitted by MIMO transmission, this spatial correlation value is obtained from a known signal for transmission channel estimation which is formed for MIMO transmission. The receiver can discriminate an available spatial multiplexing number from a spatial correlation value, and may use the value as information associated with a reception status. The above known signal has been transmitted prior to a data signal if the known signal has been transmitted by MIMO transmission. Therefore, the spatial correlation value is information obtained at the time of the execution of MIMO transmission. Consequently, information associated with a reception status is notified.

In addition, rate information at the time of reception may be held in combination with a reception electric field strength, SNR, SIR, SNIR, reception EVM, or the like, and the combination may be written in an allocated field as information associated with a reception status when a frame is to be transmitted.

The information of the table may be subjected to aging processing, for example, may be discarded or initialized in accordance with a lapse of time since the reception of the frame from which the information is generated.

As described above, information associated with the reception status of a frame in the first to 10th embodiments can be more specified. This allows a wireless terminal notified of a specific index as information associated with a reception status to use the information for transmission channel estimation between itself and the wireless terminal which has notified the information. This makes it possible to improve the accuracy of frame transmission control and the communication quality between the wireless terminals.

(12th Embodiment)

The 12th embodiment is basically the same as the 11th embodiment, and hence a different point between them will be mainly described below. The 12th embodiment differs from the 11th embodiment in that the error rate of reception frames is used as information associated with a reception status of a frame.

The error rate of frames may be, for example, a bit error rate, packet error rate, or frame error rate at a PHY layer, or a CRC error at a MAC layer.

A bit error rate, packet error rate, or frame error rate is obtained by observing a plurality of reception frames, as described in the fifth embodiment.

Alternatively, a threshold for error rates may be determined in advance, and an obtained error rate may be compared with the threshold. Whether or not the error rate exceeds the threshold may be held as information. In a table which holds such information, each error rate or information "1" or "0" representing whether or not the error rate exceeds the threshold is written in place of the reception electric field strength item in Table 1.

When a CRC error is to be used as information associated with a reception status, the presence/absence of a CRC error in the latest reception frame from a corresponding wireless terminal may be used or the occurrence ratio of CRC errors which is obtained by observing a plurality of reception frames as in the fifth embodiment may be used.

Furthermore, rate information at the time of reception may be held in combination with an error rate, and the combination may be written in an allocated field as information associated with a reception status when a frame is to be transmitted.

As described above, information associated with the reception status of a frame in the first to 10th embodiments can be more specified. This allows a wireless terminal notified of a specific index as information associated with a reception status to use the information for transmission channel estimation between itself and the wireless terminal which has notified the information. This makes it possible to improve the accuracy of frame transmission control and the communication quality between the wireless terminals.

(13th Embodiment)

The 13th embodiment is basically the same as the first to 10th embodiments, and hence an additional feature with respect to these embodiments will be mainly described below. The additional feature of the 13th embodiment with respect to the first to 10th embodiments is that the application purpose of information (I_rx) associated with a reception status is specified. This information serves as transmission control information for a wireless terminal which has received it.

According to the description of the first to 10th embodiments, a wireless terminal which has received information (I_rx) associated with a reception status uses the information for transmission control on the next frame to be transmitted. In the 13th embodiment, this information is used for, for example, the adjustment of a transmission rate. Alternatively, the information may be used for the adjustment of transmission power for a frame to be transmitted or may be used for the adjustment of the number of transmission antennas in the MIMO system described in the sixth embodiment. As information (I_rx) associated with a reception status, for example, information like that described in the 11th or 12th embodiment is used.

Figure 23:
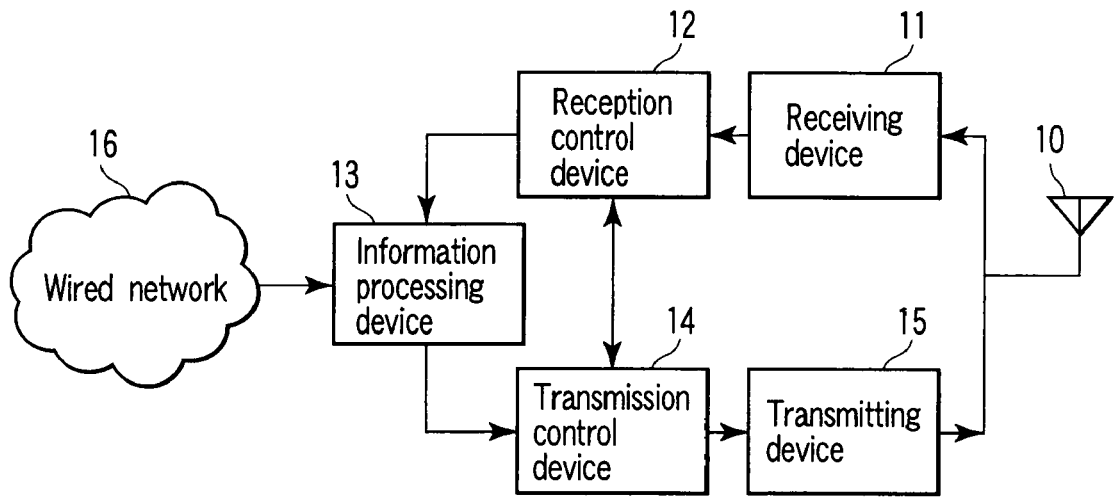
FIG. 23 is a view for explaining the arrangement of a transmitting/receiving device in a wireless base station according to the 10th embodiment.

FIG. 23 shows the arrangement of a transmitting/receiving device in a wireless base station 1.

The wireless base station 1 comprises at least a antenna 10, receiving device 11, reception control device 12, information processing device 13, transmission control device 14, and transmitting device 15. When, for example, the information processing device 13 is instructed by user's operation to generate transmission data or transmit transmission data (when a transmission request is issued), the information processing device 13 transfers the transmission data to the transmission control device 14. This transmission data may be, for example, an IP packet. The transmission control device 14 performs predetermined transmission processing complying with, for example, the IEEE 802.11 standard specifications (including standard specifications referred to as amendments and recommended practices of IEEE 802.11), including generating a frame to be broadcast, multicast, or unicast to another or other wireless base stations or wireless terminals. The digital data of the MAC frame defined in, for example, IEEE 802.11, which is generated in this case, is converted into a radio signal having a predetermined frequency through the transmitting device 15. This signal is then transmitted as a transmission signal to another wireless base station or wireless terminal. The information processing device 13 may be connected to a wired network 16. Upon receiving data from the wired network 16, the information processing device 13 processes the data in the same manner and outputs the resultant data as a transmission signal when the data is addressed to another wireless base station or wireless terminal.

Reception data input from the antenna 10 is formed into a reception signal by processing including demodulation and decoding in the receiving device 11. When this signal is input to the reception control device 12, predetermined reception processing complying with the IEEE 802.11 standard or the like is performed for the signal. The reception control device 12 converts the reception signal into a MAC frame as digital data, extracts reception data from the data field in the MAC frame, and transfers it to the information processing device 13. In this case, the information processing device 13 performs processing, e.g., displaying the reception data on the display. Note that the information processing device 13 may perform various kinds of information processing other than the above processing. When the information processing device 13 is connected to the wired network 16, and the reception data is addressed to another terminal such as another wireless base station connected to the wired network 16, the data is output from the information processing device 13 to the wired network 16.

The wireless base station 1 acquires information (I_rx) associated with reception information from a wireless terminal 101 through the reception control device 12, and notifies it to the transmission control device 14. When transmitting a frame to the wireless terminal 101, the transmission control device 14 uses this information for transmission control. For example, the transmission control device 14 holds information (I_rx) associated with a reception status from each wireless terminal in the form of a table. Table 2 is an example of this table. In this example, the presence/absence of a margin to the limit level of the receiver performance on the wireless terminal side is represented by "1" or "0" as in the 11th embodiment.

TABLE 2

| MAC address (hexadecimal notation) | Presence/absence of margin of receiver (1/0) |
|---|---|
| 0 x 55 0 x 44 0 x 33 0 x 22 0 x 11 0 x 00 | 1 |
| 0 x 11 0 x 22 0 x 33 0 x 44 0 x 55 0 x 66 | 0 |

The information associated with a reception status which is acquired from a reception frame may be held in the table after being processed by the receiving wireless terminal instead of being directly held in the table. This makes it possible to hold information which can be easily used by a wireless terminal which is to perform transmission control. For example, when information associated with a reception status is expressed in analog form (as the power value of an actual reception electric field strength), the information may be converted into a level value. Alternatively, a threshold is determined, and this information may be converted into information indicating whether or not the value exceeds the threshold.

For example, this transmission control is the adjustment of a transmission rate or the adjustment of a transmission power for the transmission of a frame. Alternatively, the transmission control may be the adjustment of the number of transmission antennas in the MIMO system described in the sixth embodiment. Only parameters used at the time of transmission which are determined by such transmission control may be written in a table in advance, together with the identifiers of wireless terminals.

The information of the table may be subjected to aging processing, for example, may be discarded or initialized in accordance with a lapse of time since the reception of the frame from which the information is generated.

Figure 24:
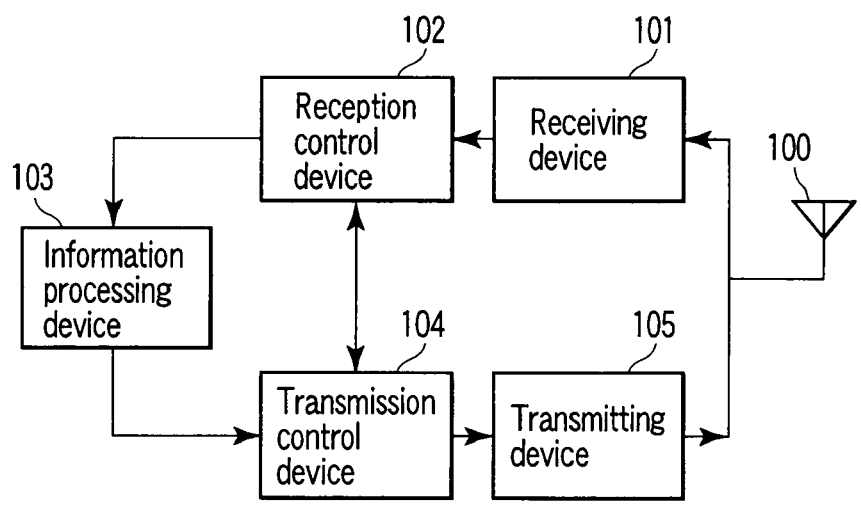
FIG. 24 is a view for explaining the arrangement of a transmitting/receiving device in a wireless terminal according to the 10th embodiment.

FIG. 24 shows the arrangement of a transmitting/receiving device in the wireless terminal 101. The wireless terminal 101 comprises at least a antenna 100, receiving device 101, reception control device 102, information processing device 103, transmission control device 104, and transmitting device 105.

When, for example, the information processing device 103 is instructed by user's operation to generate transmission data or transmit transmission data (when a transmission request is issued), the information processing device 103 transfers the transmission data to the transmission control device 104. This transmission data may be, for example, an IP packet. The transmission control device 104 performs predetermined transmission processing complying with, for example, IEEE 802.11, including generating a frame to be broadcast, multicast, or unicast to another or other wireless base stations or wireless terminals. The digital data of the MAC frame defined in, for example, IEEE 802.11, which is generated in this case, is converted into a radio signal having a predetermined frequency through the transmitting device 105. This signal is then transmitted as a transmission signal from the antenna 100 to another wireless base station or wireless terminal.

Reception data input from the antenna 100 is formed into a reception signal by processing including demodulation and decoding in the receiving device 101. When this signal is input to the reception control device 102, predetermined reception processing complying with IEEE 802.11 or the like is performed for the signal. The reception control device 102 converts the reception signal into a MAC frame as digital data, extracts reception data from the data field in the MAC frame, and transfers it to the information processing device 103. In this case, the information processing device 103 performs processing, e.g., displaying the reception data on the display. Note that the information processing device 103 may perform various kinds of information processing other than the above processing.

Information (I_rx) associated with a reception status is processed by the reception control device 102 and transmission control device 104 of the receiving device 101 in the same manner as the reception control device 12 and transmission control device 14 of the wireless base station 1.

As described above, a wireless terminal notified of information associated with a reception status can use the information for transmission channel estimation between itself and the wireless terminal which has notified the information. This makes it possible to improve the accuracy of frame transmission control and the communication quality between the wireless terminals.

(14th Embodiment)

The 14th embodiment is based on the first, second, sixth, seventh, and eighth embodiments, and hence an additional feature of the 14th embodiment with respect to these embodiments will be mainly described below. The additional feature of the 14th embodiment with respect to the first, second, sixth, seventh, and eighth embodiments is that when an elapsed time since the reception of information (I_rx) associated with a reception status from a given wireless terminal exceeds a given threshold, a frame which prompts the transmission of a frame to which information (I_rx) associated with a reception status is added is transmitted.

In the case shown in FIG. 5, for example, when an elapsed time since the reception of information (I_rx) associated with a reception status from a wireless terminal 101 exceeds a given threshold, an RTS frame is generated and transmitted. This equally applies to the RTS' frame in FIG. 6, the Poll frame in FIG. 7, the RTS frame in FIG. 12, the RTS' frame in FIG. 13, the Poll frame in FIG. 14, the RTS frame in FIG. 16, the RTS frame in FIG. 17, and the like.

The determination whether or not an elapsed time since the reception of information (I_rx) associated with a reception status from a given wireless terminal exceeds a given threshold and the accompanying generation of a frame which prompts the transmission of a frame to which information (I_rx) associated with a reception status is added are realized by a transmission control device 14 in FIG. 23 in a wireless base station, which records in advance, in the table held by itself, the notification of the end time of the reception of a reception frame from a reception control device 12 and independently performs determination. Alternatively, the above processing is realized by cooperative operation as follows. When a timer which is activated by a reception frame from each terminal expires (exceeds a threshold time), the reception control device 12 notifies the transmission control device 14 of the corresponding information. The transmission control device 14 then generates a prompt frame. As in the wireless base station, in the wireless terminal, a transmission control device 104 in FIG. 24 generates a prompt frame independently or in cooperation with a reception control device 102.

As described above, when an elapsed time since the reception of information (I_rx) associated with a reception status from a given wireless terminal exceeds a given threshold, a frame which prompts the transmission of a frame to which information (I_rx) associated with a reception status is added. This makes it possible to efficiently receive information (I_rx) associated with a reception status.

(15th Embodiment)

The 15th embodiment is based on the fourth, fifth, sixth, ninth, and 10th embodiments, and hence an additional feature of the 15th equation with respect to these embodiments will be mainly described below. The additional feature of the 15th embodiment with respect to the fourth, fifth, sixth, ninth, and 10th embodiments is that when an elapsed time since the generation of information associated with a reception status on the basis of a frame received from a given wireless terminal is within a given threshold, the information associated with the reception status is added to a frame to be transmitted to the wireless terminal.

In the case shown in FIG. 8, for example, when an elapsed time since the generation of information associated with a reception status on the basis of a frame received from a receiving device 101 exceeds a given threshold, even if the information is transmitted to the receiving device 101 upon adding it to a Poll' frame, the information is not useful for transmission control on a frame on the receiving device 101 side. This embodiment is therefore directed to the operation of transmitting information associated with a reception status to the receiving device 101 upon adding it to a Poll' frame if the above elapsed time falls within a given threshold. This equally applies to the Poll' frame in FIG. 9, the Poll' frame in FIG. 15, the Poll' frame in FIG. 19, the Poll' frame in FIG. 20, the RTS" frame in FIG. 21, the RTS" frame in FIG. 22, and the like.

The determination whether or not an elapsed time since the generation of information associated with a reception status on the basis of a frame previously received from a given wireless terminal a given wireless terminal falls within a given threshold and the accompanying addition of the information associated with the reception status to a frame to be transmitted to the wireless terminal are realized by a transmission control device 14 in FIG. 23 in a wireless base station, which records in advance, in the table held by itself, the notification of the end time of the reception of a reception frame from a reception control device 12, independently performs determination, and deletes the information from the table when the elapsed time exceeds the threshold time. Alternatively, the above processing is realized by cooperative operation as follows. When a timer which is activated by a reception frame from each terminal expires (exceeds a threshold time), the reception control device 12 notifies the transmission control device 14 of the corresponding information. The transmission control device 14 then deletes the information from the table.

Although the quoted examples of frame exchange shown in the above drawings do not include a case wherein the wireless terminal 101 adds information associated with a reception status to a transmission frame, such a case may occur as described in the ninth embodiment. In this case, as in the case of a wireless base station, in a wireless terminal, a transmission control device 104 in FIG. 24 deletes corresponding information associated with a reception status from the table independently or in cooperation with a reception control device 102.

As described above, if an elapsed time since the generation of information associated with a reception status on the basis of a frame previously received from a given wireless terminal falls within a given threshold, the information (I_rx) associated with the reception status which is useful for the receiving wireless terminal can be transmitted thereto by adding the information associated with the reception status to a frame to be transmitted to the wireless terminal, thereby realizing efficient operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless terminal capable of performing transmission by a first transmission scheme and a second transmission scheme, comprising:
   a transmitter to transmit a first frame, using the second transmission scheme; and
   a receiver to receive a second frame for which the first transmission scheme is used and which notifies the wireless terminal of information associated with a reception status,
   wherein the transmitter transmits a third frame, using the first transmission scheme adjusted based on the information associated with the reception status,
   transmission by the first transmission scheme is performed based on carrier sense, transmission by the second transmission scheme is performed based on carrier sense,
the transmission by the first transmission scheme can be received and decoded by a first reception scheme,
the transmission by the second transmission scheme can be received and decoded by both the first reception scheme and a second reception scheme, and
a period for inhibiting, if the first frame is received by another wireless terminal other than a destination wireless terminal, transmission by the another wireless terminal is set in the first frame.

2. The wireless terminal of claim 1, wherein an elapsed time since reception of the information associated with the reception status is compared with a threshold, and when the elapsed time exceeds the threshold, the first frame is transmitted.

3. The wireless terminal of claim 1, wherein the information associated with the reception status is a transmission channel characteristic.

4. A wireless terminal capable of performing transmission by a first transmission scheme, comprising:
a transmitter to transmit a first frame, using the first transmission scheme; and
a receiver to receive a second frame for which a second transmission scheme is used and which notifies the wireless terminal of information associated with a reception status,
wherein the transmitter transmits a third frame, using the first transmission scheme adjusted based on the information associated with the reception status,
transmission by the first transmission scheme is performed based on carrier sense,
the transmission by the first transmission scheme can be received and decoded by a first reception scheme,
the transmission by the second transmission scheme can be received and decoded by both the first reception scheme and a second reception scheme, and
a period for inhibiting, if the second frame is received by another wireless terminal other than a destination wireless terminal, transmission by the another wireless terminal is set in the second frame.

5. The wireless terminal of claim 4, wherein a most robust transmission method or a lowest transmission rate by which the destination wireless terminal is capable of receiving and decoding in the first transmission scheme is used when the first frame is transmitted.

6. The wireless terminal of claim 4, wherein an elapsed time since reception of the information associated with the reception status is compared with a threshold, and when the elapsed time exceeds the threshold, the first frame is transmitted.

7. The wireless terminal of claim 4, wherein the information associated with the reception status is a transmission channel characteristic.

8. A wireless terminal capable of performing transmission by a first transmission scheme, comprising:
a receiver to receive a first frame for which a second transmission scheme is used and, after the first frame, to receive a second frame for which the first transmission scheme is used and which notifies the wireless terminal of information associated with a reception status; and
a transmitter to transmit a third frame, using the first transmission scheme adjusted based on the information associated with the reception status,
wherein transmission by the first transmission scheme is performed based on carrier sense,
the transmission by the first transmission scheme can be received and decoded by a first reception scheme,
transmission by the second transmission scheme can be received and decoded by both the first reception scheme and a second reception scheme, and
a period for inhibiting, if the first frame is received by another wireless terminal other than a destination wireless terminal, transmission by the another wireless terminal is set in the first frame.

9. The wireless terminal of claim 8, wherein the information associated with the reception status is a transmission channel characteristic.

10. A wireless terminal capable of performing transmission by a first transmission scheme, comprising:
a receiver to receive a first frame for which a second transmission scheme is used; and
a transmitter to transmit a second frame, using the first transmission scheme, to notify a destination wireless terminal of information associated with a reception status,
wherein the receiver receives a third frame for which the first transmission scheme adjusted based on the information associated with the reception status is used,
transmission by the first transmission scheme is performed based on carrier sense,
the transmission by the first transmission scheme can be received and decoded by a first reception scheme,
transmission by the second transmission scheme can be received and decoded by both the first reception scheme and a second reception scheme, and
a period for inhibiting, if the first frame is received by another wireless terminal other than the destination wireless terminal, transmission by the another wireless terminal is set in the first frame.

11. The wireless terminal of claim 10, wherein the second frame is a response frame to the first frame.

12. The wireless terminal of claim 10, wherein the first transmission scheme is a scheme for transmitting signals via a plurality of transmission antennas, and the first reception scheme is a scheme for receiving signals via a plurality of reception antennas.

13. The wireless terminal of claim 10, wherein a most robust transmission method or a lowest transmission rate by which the destination wireless terminal is capable of receiving and decoding in the first transmission scheme is used when the second frame is transmitted.

14. The wireless terminal of claim 10, wherein transmission of the second frame using the first transmission scheme is permitted by the first frame.

15. The wireless terminal of claim 10, wherein the third frame is a data frame, and further comprising:
an antenna for transmitting and receiving frames; and
an information processing apparatus for processing data contained in the data frame.

16. The wireless terminal of claim 10, further comprising:
a display;
an antenna for transmitting and receiving frames; and
an information processing apparatus for processing data received by the antenna and supplies the display with the data.

17. The wireless terminal of claim 10, wherein the information associated with the reception status is a transmission channel characteristic.

18. A wireless terminal capable of performing transmission by a second transmission scheme, comprising:
a receiver to receive a first frame for which a first transmission scheme is used; and a transmitter to transmit a second frame, using the second transmission scheme, to notify a destination wireless terminal of information associated with a reception status, wherein the receiver receives a third frame for which the first transmission scheme adjusted based on the information associated with the reception status is used, transmission by the second transmission scheme is performed based on carrier sense, transmission by the first transmission scheme can be received and decoded by a first reception scheme, the transmission by the second transmission scheme can be received and decoded by both the first reception scheme and a second reception scheme, and a period for inhibiting, if the second frame is received by another wireless terminal other than the destination wireless terminal, transmission by the another wireless terminal is set in the second frame.

19. The wireless terminal of claim 18, wherein the second frame is a response frame to the first frame.

20. The wireless terminal of claim 18, wherein the first transmission scheme is a scheme for transmitting signals via a plurality of transmission antennas, and the first reception scheme is a scheme for receiving signals via a plurality of reception antennas.

21. The wireless terminal of claim 18, wherein the third frame is a data frame, and further comprising:
an antenna for transmitting and receiving frames; and
an information processing apparatus for processing data contained in the data frame.

22. The wireless terminal of claim 18, further comprising:
a display;
an antenna for transmitting and receiving frames; and
an information processing apparatus for processing data received by the antenna and supplies the display with the data.

23. The wireless terminal of claim 18, wherein the information associated with the reception status is a transmission channel characteristic.

24. A wireless terminal capable of performing transmission by a first transmission scheme and a second transmission scheme, comprising:
a transmitter to transmit a first frame, using the second transmission scheme, and after the first frame, to transmit a second frame, using the first transmission scheme, to notify a destination wireless terminal of information associated with a reception status; and
a receiver to receive a third frame for which the first transmission scheme adjusted based on the information associated with the reception status is used, wherein transmission by the first transmission scheme is performed based on carrier sense, transmission by the second transmission scheme is performed based on carrier sense, the transmission by the first transmission scheme can be received and decoded by a first reception scheme, the transmission by the second transmission scheme can be received and decoded by both the first reception scheme and a second reception scheme, and a period for inhibiting, if the first frame is received by another wireless terminal other than the destination wireless terminal, transmission by the another wireless terminal is set in the first frame.

25. The wireless terminal of claim 24, wherein the information associated with the reception status of the second frame is generated based on a reception frame that is previously received.

26. The wireless terminal of claim 24, wherein the first transmission scheme is a scheme for transmitting signals via a plurality of transmission antennas, and the first reception scheme is a scheme for receiving signals via a plurality of reception antennas.

27. The wireless terminal of claim 24, wherein a most robust transmission method or a lowest transmission rate by which the destination wireless terminal is capable of receiving and decoding in the first transmission scheme is used when the second frame is transmitted.

28. The wireless terminal of claim 24, wherein the second frame gives permission of transmission of the third frame.

29. The wireless terminal of claim 24, wherein an elapsed time since generation of the information associated with the reception status is compared with a threshold, and if the elapsed time is within the threshold, the information associated with the reception status is transmitted.

30. The wireless terminal of claim 24, wherein the third frame is a data frame, and further comprising:
an antenna for transmitting and receiving frames; and
an information processing apparatus for processing data contained in the data frame.

31. The wireless terminal of claim 24, further comprising
a display;
an antenna for transmitting and receiving frames; and
an information processing apparatus for processing data received by the antenna and supplies the display with the data.

32. The wireless terminal of claim 24, wherein the information associated with the reception status is a transmission channel characteristic.

* * * * *